US010755428B2

(12) United States Patent
Aswin

(10) Patent No.: US 10,755,428 B2
(45) Date of Patent: Aug. 25, 2020

(54) APPARATUSES AND METHODS FOR MACHINE VISION SYSTEM INCLUDING CREATION OF A POINT CLOUD MODEL AND/OR THREE DIMENSIONAL MODEL

(71) Applicant: The United States of America, as represented by the Secretary of the Navy, Crane, IN (US)

(72) Inventor: Buddy Aswin, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 205 days.

(21) Appl. No.: 15/954,722

(22) Filed: Apr. 17, 2018

(65) Prior Publication Data
US 2019/0122378 A1 Apr. 25, 2019

Related U.S. Application Data

(60) Provisional application No. 62/486,221, filed on Apr. 17, 2017.

(51) Int. Cl.
| | |
|---|---|
| *G06T 7/571* | (2017.01) |
| *G06T 7/579* | (2017.01) |
| *G06T 7/20* | (2017.01) |
| *G06K 9/62* | (2006.01) |
| *G06N 3/08* | (2006.01) |
| *G06K 9/00* | (2006.01) |
| *G06N 3/04* | (2006.01) |

(Continued)

(52) U.S. Cl.
CPC .............. *G06T 7/571* (2017.01); *G06F 17/12* (2013.01); *G06K 9/00208* (2013.01);
(Continued)

(58) Field of Classification Search
CPC ........... G06T 7/571; G06T 7/20; G06T 7/579; G06T 5/003; G06T 2207/30252;
(Continued)

(56) References Cited

U.S. PATENT DOCUMENTS

| | | | |
|---|---|---|---|
| 8,064,720 B2 | 11/2011 | Ozluturk | |
| 8,331,723 B2 | 12/2012 | Ozluturk | |

(Continued)

*Primary Examiner* — Carol Wang
(74) *Attorney, Agent, or Firm* — Naval Surface Warfare Center, Crane Division; Christopher A. Monsey

(57) ABSTRACT

Machine vision systems/methods and related application systems/methods are provided that includes steps/control sections including capturing pairs of multiple images from at least two cameras having overlapping fields of views and camera settings, first and second category depth estimation (DE) modules (DEM) that generates a first and second depth estimate (z), DE neural network trainer (NN) trigger system, a camera setting module, and an application that uses outputs from the first or second category DEM. The first category DEM includes featuring matching, structure from motion (SFM), depth from defocus (DFD), ratios of depth (RoD) and relative blur estimates (RBE) generators, systems of equations (SoEs) based on camera model projective geometry equations and thin lens equations module, and multiple SoE variable elimination modules using the RoDs and RBEs to reduce variables in the SoEs. The second DEM includes a NN DE trainer/use system. Also uses a reinforcement learning camera setting selection system.

11 Claims, 18 Drawing Sheets

(51) Int. Cl.
*G06F 17/12* (2006.01)
*G06T 5/00* (2006.01)
*G06K 9/46* (2006.01)

(52) U.S. Cl.
CPC ....... *G06K 9/00677* (2013.01); *G06K 9/4671* (2013.01); *G06K 9/6211* (2013.01); *G06N 3/0418* (2013.01); *G06N 3/08* (2013.01); *G06T 5/003* (2013.01); *G06T 7/20* (2013.01); *G06T 7/579* (2017.01); *G06K 9/00791* (2013.01)

(58) Field of Classification Search
CPC ........... G06T 2207/20084; G06T 2207/20081; G06K 9/00208; G06K 9/4671; G06K 9/00677; G06K 9/6211; G06K 9/00791; G06F 17/12; G06N 3/0418; G06N 3/08; G06N 3/006; G06N 3/0454; G06N 3/0445; G06N 7/005
See application file for complete search history.

(56) References Cited

U.S. PATENT DOCUMENTS

| | | | |
|---|---|---|---|
| 2004/0252862 A1* | 12/2004 | Camus | G06K 9/00201 382/104 |
| 2005/0093697 A1* | 5/2005 | Nichani | G06K 9/00778 340/545.1 |
| 2010/0014781 A1* | 1/2010 | Liu | H04N 13/261 382/285 |
| 2010/0194971 A1* | 8/2010 | Li | G02B 7/38 348/349 |
| 2011/0080466 A1* | 4/2011 | Kask | G06T 5/006 348/43 |
| 2012/0002871 A1* | 1/2012 | Hu | G06T 7/529 382/164 |
| 2012/0105602 A1* | 5/2012 | McNamer | G06T 7/20 348/50 |
| 2012/0237114 A1* | 9/2012 | Park | G06T 7/593 382/154 |
| 2012/0249816 A1* | 10/2012 | Li | H04N 5/23212 348/220.1 |
| 2013/0329015 A1* | 12/2013 | Pulli | H04N 13/239 348/47 |
| 2015/0054986 A1* | 2/2015 | Tanaka | H04N 5/2621 348/239 |
| 2015/0248745 A1* | 9/2015 | Chen | G06T 5/003 382/154 |
| 2016/0071279 A1* | 3/2016 | Wu | H04N 13/271 348/48 |
| 2018/0059679 A1* | 3/2018 | Taimouri | G06N 3/0454 |
| 2018/0139431 A1* | 5/2018 | Simek | H04N 13/232 |
| 2018/0231871 A1* | 8/2018 | Wang | G06T 7/50 |

* cited by examiner

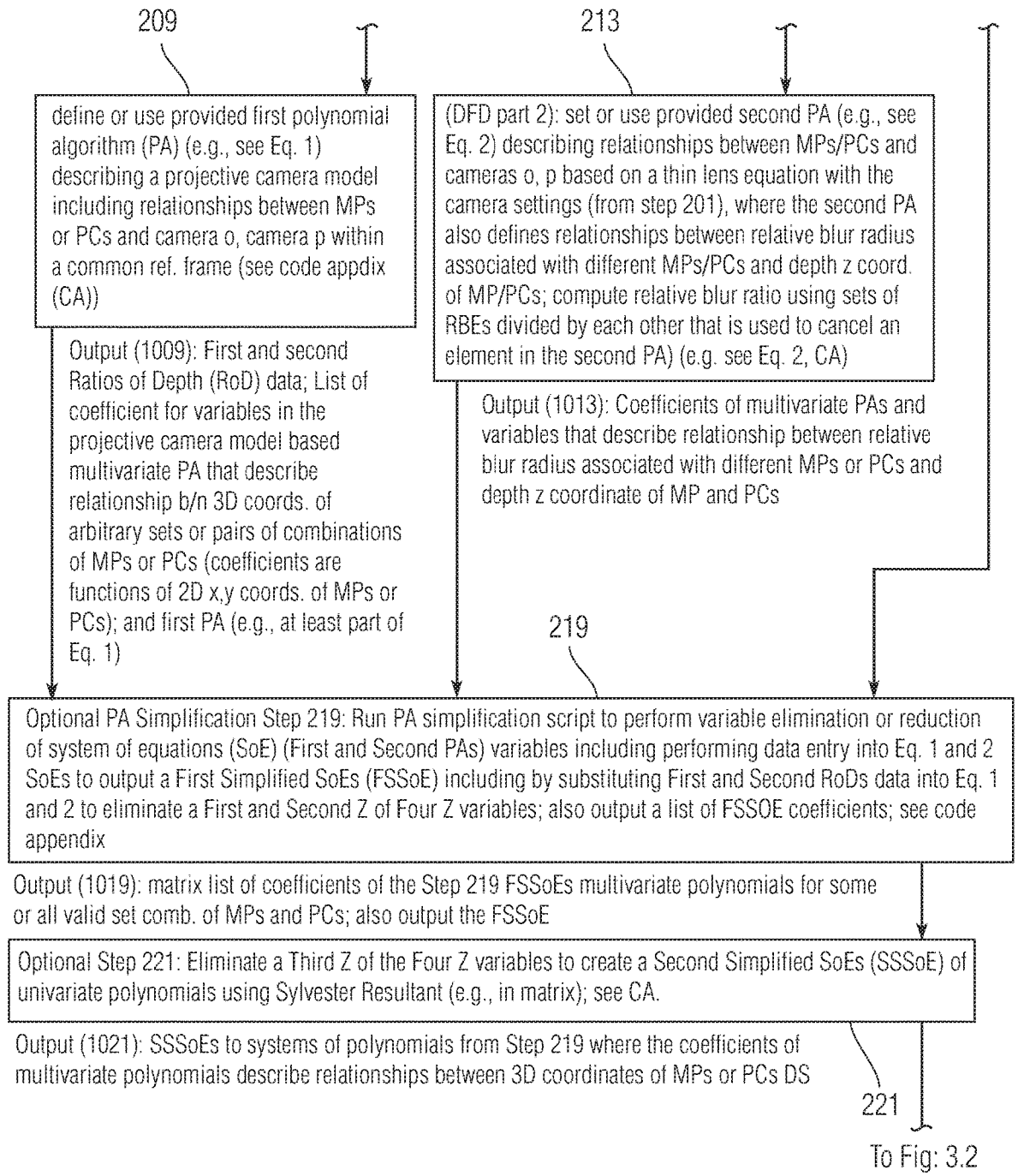
Fig. 3.1

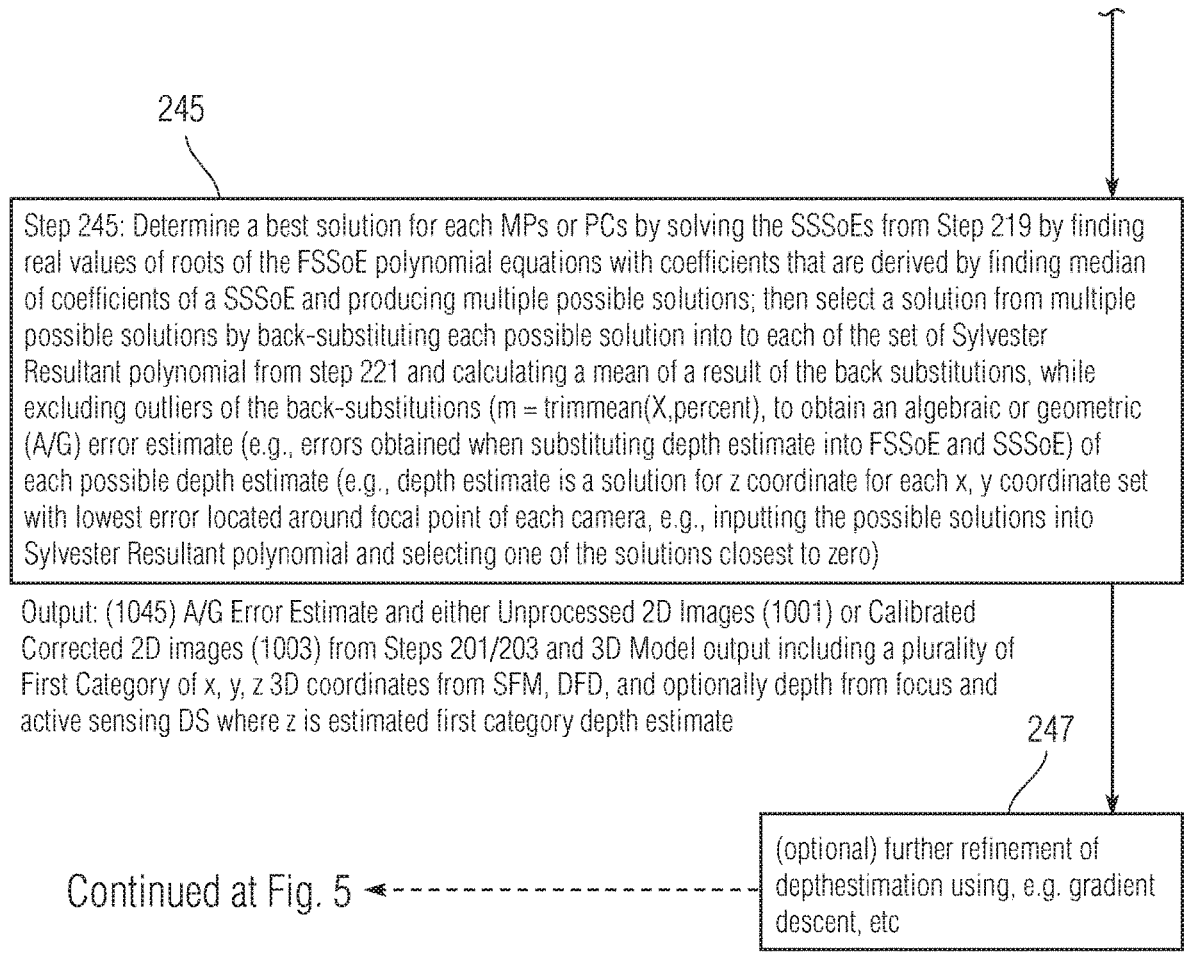
Fig. 3.2

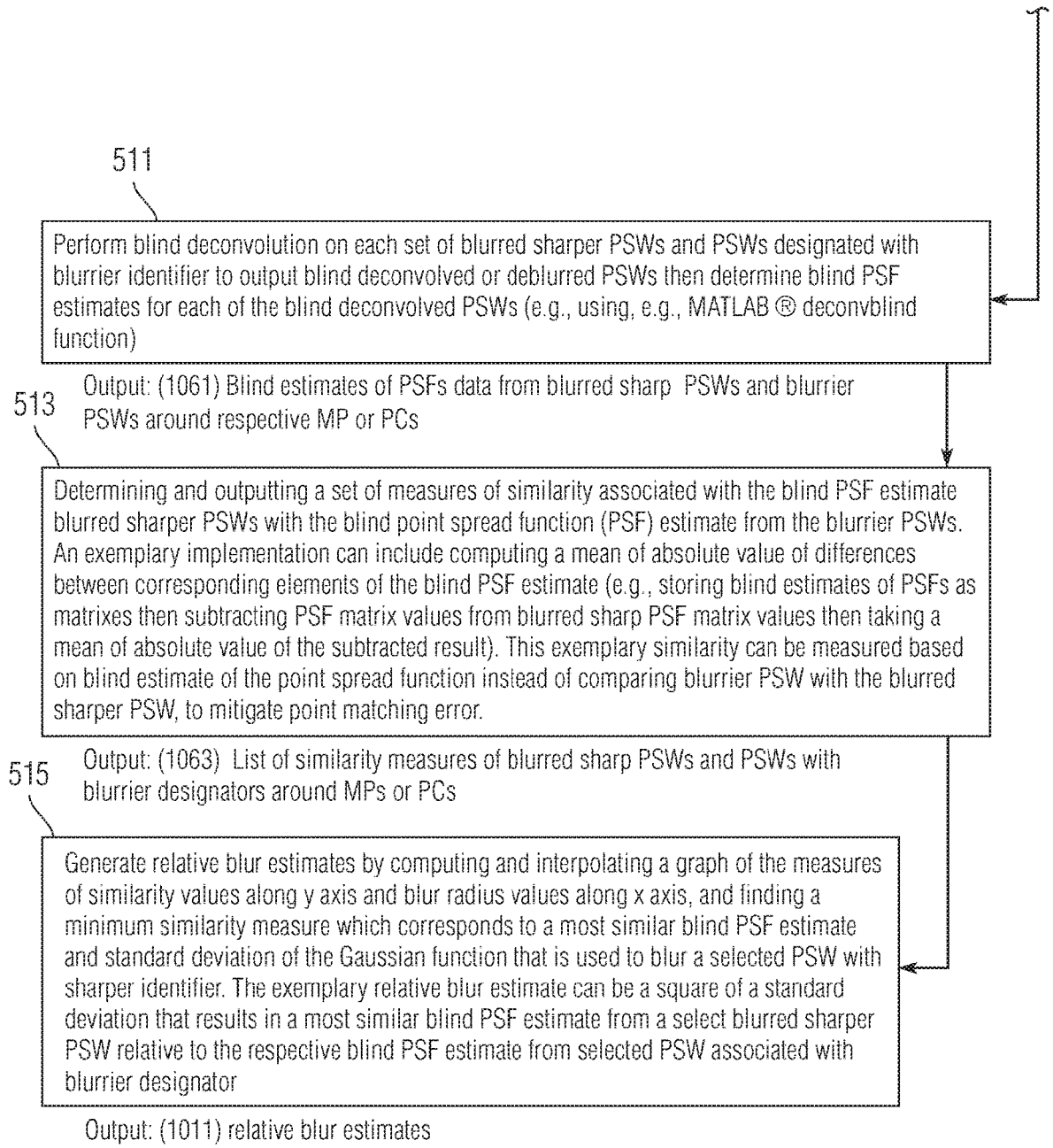
Fig. 4.1

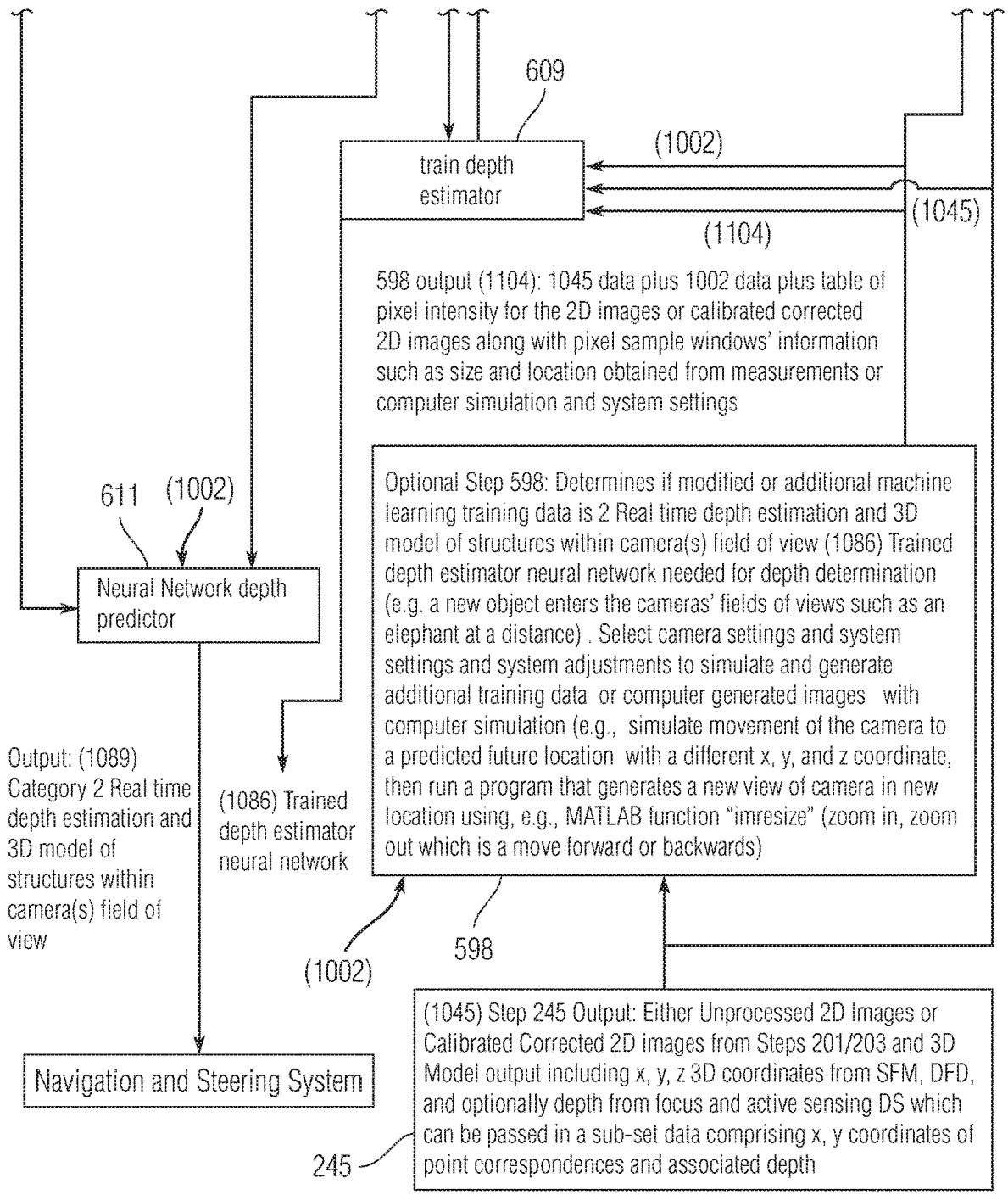
Fig. 5.1

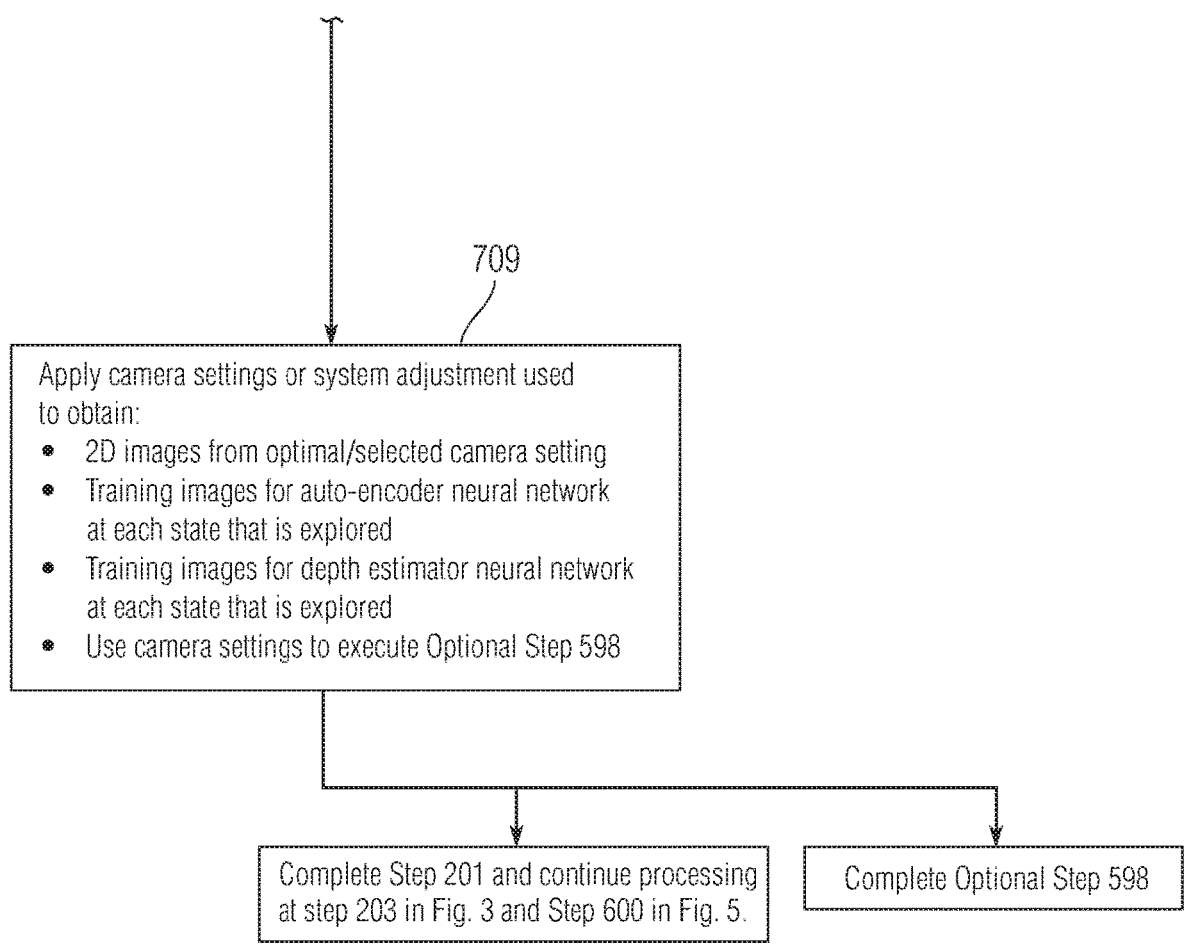
Fig. 7.1

APPARATUSES AND METHODS FOR MACHINE VISION SYSTEM INCLUDING CREATION OF A POINT CLOUD MODEL AND/OR THREE DIMENSIONAL MODEL

CROSS-REFERENCE TO RELATED APPLICATION

This patent application claims priority to U.S. Provisional Patent Application Ser. No. 62/486,221, filed Apr. 17, 2017, titled APPARATUSES AND METHODS FOR MACHINE VISION SYSTEMS INCLUDING CRATION OF A POINT CLOUD MODEL AND/OR THREE DIMENSIONAL MODEL BASED ON MULTIPLE IMAGES FROM DIFFERENT PERSPECTIVES AND COMBINATION OF DEPTH CUES FROM CAMERA MOTION AND DEFOCUS WITH VARIOUS APPLICATIONS INCLUDING NAVIGATION SYSTEMS, AND PATTERN MATCHING SYSTEMS AS WELL AS ESTIMATING RELATIVE BLUR BETWEEN IMAGES FOR USE IN DEPTH FROM DEFOCUS OR AUTOFOCUSING APPLICATIONS, the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,427) is assigned to the United States Government and is available for licensing for commercial purposes. Licensing and technical inquiries may be directed to the Technology Transfer Office, Naval Surface Warfare Center Crane, email: Cran_CTO@navy.mil

BACKGROUND AND SUMMARY OF THE INVENTION

The present invention relates to machine vision systems used to create models based on two dimensional images from multiple perspectives, multiple camera settings (camera setting include system states (e.g. vehicle speed, direction)), active and passive range sensors used for a variety of applications. In particular, machine vision systems can be provided for various machine vision applications.

Common imaging systems are made without specific requirements to provide three dimensional (3D) imaging or range finding capability. However, 3D scene and range information can be recovered from a collection of two dimensional (2D) images. Among various 3D reconstruction algorithms are Structure from motion (SFM), which requires translational movement of the camera, and Depth from Defocus (DFD) algorithms, which restricts camera movement.

Research and development was undertaken to address limitations of each of these methods by looking at how limitations and disadvantages associated with current approaches of using 2D images to create 3D models of structure within the 2D images may be mitigated which included modifications, combinations, and additions with regard to SFM and DFD approaches. In particular, efforts were undertaken to compare precision and accuracy of DFD and SFM and find an approach to create embodiments which included modifications and combinations of useful aspects of DFD and SFM while eliminating or addressing mutually exclusive limitations on their use.

Various SFM, stereo vision, and DFD algorithms have been developed for various applications. For example, one approach known as the 8 Points Algorithm, described in Hartley, R. I., Zisserman, A., "Multiple View Geometry in Computer Vision", Cambridge University Press, $2^{nd}$ edition, ISBN: 0521540518; 2004, models or describes translation and rotational movement of a camera as a linear transform function in order to determine camera location and 3D locations but it has a substantial degree of error in different failure modes (e.g., when distance between camera positions is small). Translation and rotation of a camera in use can be represented as a system of symbolic polynomials but it still uses a pre-existing point matching which generates errors as discussed herein and it also requires substantial computing power which is impracticable in various applications. Many real time 3D estimation techniques (e.g., Simultaneous Localization And Mapping (SLAM) also rely on parallel processing with a more costly or power consuming resources to provide necessary computing power. Early DFD techniques require two pictures be captured from a matching camera location and angle (pose). In addition, methods to estimate relative blur between points in two 2D images used with DFD are sensitive to image shifting and scaling, which are common occurrences in real world application image recording processes.

Existing SFM algorithms will not work well under certain degenerate condition (e.g., failure modes or conditions) such as pure rotation and a combination of image point locations and camera motions. Many imaging systems, such as rotating security cameras or a forward facing camera on a vehicle, experience various errors or failure modes when used with SFM algorithms or systems. In particular, a system that attempts to determine or estimate depth (or z coordinate associated with pairs of feature matched x, y coordinates in multiple images) based on use of SFM techniques do not work well (e.g., produces significant errors) when distances between cameras are small relative to distance between cameras and structures within camera(s) field(s) of view. Existing SFM approaches also experience errors in performing feature matching between two different images taken from two perspectives (with small distances between image capture positions) to the same structures within fields of view to find x, y coordinates for feature matched pixels. Such feature matched pixel x, y coordinates are later used to perform triangulation steps. Errors occur at least in part due to how the traditional SFM systems using such feature matching use such 2D images to derive difference(s) in two dimensional coordinates that is small so that they end up measuring mostly noise in the feature matching step. Also, traditional DFD methods assume that a camera will stay in one place and the cameras' setting change which creates sensitivity to camera motion error and difficult or complex/costly relative defocus blur estimation is needed to perform depth from defocus estimation with cameras in motion.

Real time application based on existing SFM and DFD methods require substantial computational resources and therefore have significant barriers for such use. Passive depth sensing using a single monocular image has been used in real time but still requires substantial resources and also has inherent limitations and tradeoffs including a need for a pre-trained machine learning system. Typically, existing machine learning algorithms used in relation to monocular depth estimation are trained offline using active range finder and a set of 2D images, and then the trained algorithm is used to determine depth in real time.

Accordingly, existing systems or technology have a variety of disadvantages when used for applications such as range finding, 3D mapping, machine vision etc. when using various techniques in various failure modes or conditions. Thus, improvements to the existing art were needed to address various disadvantages and enable various applications.

Improved combinations of SFM, DFD, monocular depth estimation processes, machine learning systems and apparatuses including imager systems allows a vehicle with mounted two dimensional cameras which are relatively close together to explore surrounding environment and mitigate measurement errors using multiple camera settings without a pre-trained machine learning system as well as being able to operate with movement as well as without movement.

An embodiment of the invention can include live training of the machine learning algorithm that can be performed based using output from SFM and DFD measurement and a series of 2D images that are acquired live (as a vehicle is stationary or moving in an environment) and with computer generated images and data. At the same time, the machine learning is trained in a parallel process and the newly trained machine learning algorithm can be used for depth prediction after the training is done. In addition, since the accuracy of passive range sensing is dependent to the selected camera settings, an optimal camera setting for a specific environment, weather condition and object distance or characteristics can be selected using machine learning that search for camera settings that minimize algebraic or geometric errors that is obtained in passive depth estimation calculation.

Also, generally machine learning systems also require a significant amount of learning data or even if it is pre-trained it will not be able to adapt or operate in different or anomalous environments. Thus, embodiments of the invention enable an exemplary system to rapidly adapt to new environments not found in its prior training data. Also, a number of systems use only one camera or have two cameras which are set close to each other and do not move. These systems require increased ability to perform various tasks such as range finding or 3D mapping with significant accuracy however existing systems or methods would not accommodate such needs.

By integrating and modifying DFD and SFM, camera and depth location can be recovered in some conditions where structure from motion is unstable. Existing algorithms that combines multiple depth cues from monocular camera focuses mainly on the triangulation of 3D scene from known, pre-calibrated camera positions.

In at least some embodiments of the invention, a 3D reconstruction from a near focused and a far focused 2D synthetic images are performed without prior knowledge of the camera locations. Depth cues from DFD and SFM machine instructions or logic sequences or algorithms are combined to mitigate errors and limitations of individual SFM or DFD algorithm. Several SFM and DFD approaches, including state of the art techniques are discussed or provided herein. A robust relative blur estimation algorithm and a method to integrate DFD and SFM cues from multiple images are also provided.

An exemplary point cloud SFM-DFD fusion method approach improves robustness or capacity of depth measurement in situations where multiple cameras are located in a relatively small but significant distance apart compared to depth being measured mitigating or addressing prior art difficulties in feature matching (e.g., is inconsistent). For example, embodiments of the invention are capable of operating in cases where several existing generic SFM and DFD software systems failed to generate 3D reconstructions. Exemplary improved point cloud SFM-DFD fusion methods or systems were able to generate an improved 3D point cloud reconstruction of structures in scenes captured by exemplary systems.

Passive range finder and 3D mapping applications. Generally, exemplary control systems, algorithms or machine instructions are provided to combine passive 3D depth cues from 2D images taken at different sensor locations (e.g., SFM) or settings (e.g., DFD) to construct 3D depth maps from 2D images using symbolic-numeric approach that deliver robustness against or capacity to operate with respect to various degenerate conditions that traditional techniques were unable to operate effectively within.

In particular, embodiments are provided which include an algorithm to estimate relative blur between elements of at least sets of two or sets of images taken from different location and/or sensor settings that are robust against multi-view image transformation and multi-view/stereo correspondence errors. Embodiments can include machine readable instructions or control instructions including an algorithm to measure relative blur in sets of 2D images taken from different perspectives and camera setting, an algorithm to combine active depth sensor and passive 3D depth cues from images taken at different sensor location (SFM) or settings (DFD), an algorithm to estimate 3D information from single monocular image using statistical or machine learning techniques that can be trained with live and computer generated images and video, and can provide adjustable processing speed by constraining a size of feature vectors and probability distribution function(s) based on limited computing resources, and a machine learning algorithm to find optimal camera settings for 3D depth estimation.

Additional uses. Exemplary embodiments can also be used in a similar manner as other 3D vision, range finder and blur estimation methods. Examples include potentially novel applications including applications of 3D imaging including: 3D imaging and image fusion with multiple sensors at multiple platforms and locations and to generate a synthetic aperture sensor; estimating relative blur between two images can be estimated by the algorithm, and the physical mechanism of the blurred image formation can be modeled based on the sensors and scene that produce such images. A combination of relative blur information and the blur formation model may yield information on camera setting or scene characteristics.

An exemplary algorithm was tested with a thin lens model, but different models can be used for other hardware (e.g., fish eye lens). Additional applications can include integration of exemplary algorithm with other computer vision algorithms. Estimation of relative blur of objects or scene in 2D picture as well as the 3D map can be utilized in super resolution imaging algorithm, occlusion removal, light field camera, motion blur estimation, image de-blurring, image registration, and as an initial 3D scene estimation for an iterative 3D estimation algorithm. Exemplary algorithms can be used to extract camera information from collection of 2D pictures, including camera calibration, camera pose, and sensor vibration correction. Relative blur estimation can be used for auto focus. Exemplary blur estimation algorithms provides robustness against image transformations, transformation induced errors, including hand shaking, which occurs when images are taken with a hand-held camera.

Another application can include use with 3D imaging usable for triangulation, target tracking (e.g. with Kalman filter), passive range finder and fire control system. Another application can include use as a part of gesture recognition system interfaces. Another application can be used with SFM that can be used to extrapolate 2D images from an arbitrary point of view, render a 3D world from sample 2D images, produce visual effects in movies, and for applications in virtual and augmented reality application. Another application can include embodiments incorporating exemplary methods using 3D imaging microscopic objects (including electronics and biological samples) with microscopes and for applications in astronomy with telescopes. Exemplary methods can be applicable for 3D scanner, objects recognition, manufacturing, product inspection and counterfeit detection, and structural and vehicle inspections. Embodiments can also be used in relation to mitigating atmospheric changes that may also generate relative blur information that can be modeled and used for depth measurement, or if depth of an object is known, the relative blur may provide information on scintillation, weather and atmospheric conditions (e.g. fog, turbulence, etc.). Atmospheric changes may also generate relative blur data that can be modeled and used for depth measurement. Embodiments can also be used with consumer camera or medical tools (e.g. ophthalmoscope, otoscope, endoscope), where exemplary designs or methods can be applied to obtain 3D measurement and other characterization of bumps, plaque, swellings, polyps, tissue samples or other medical conditions. Exemplary methods can also be applied for vehicle navigation; sensor and vehicle pose estimation, visual odometry (e.g., measuring position of a vehicle based on visual cues) and celestial navigation. With the knowledge of camera movement, embodiments of the invention can be modified to measure movements of objects in the image.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
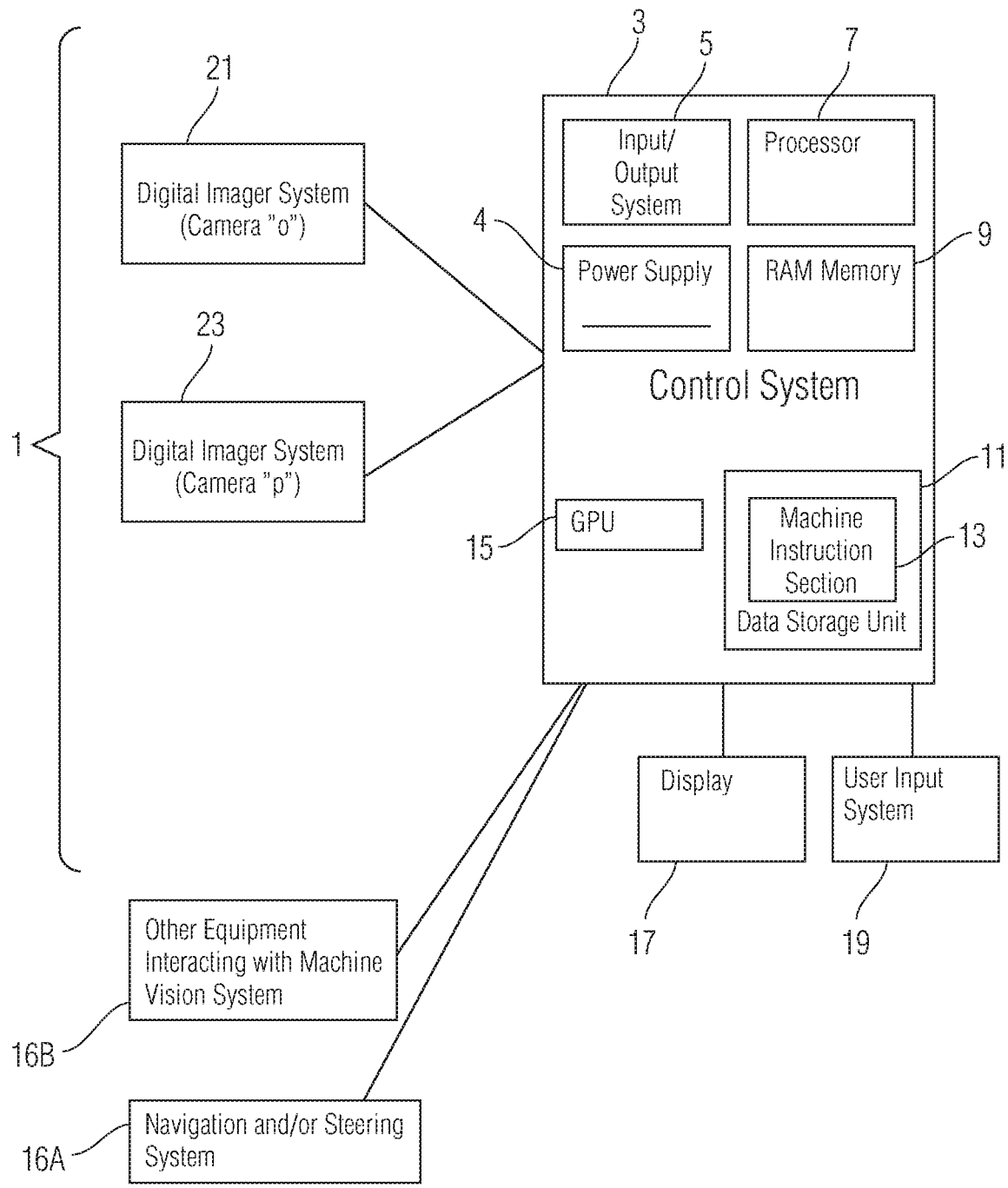
FIG. 1 shows an exemplary embodiment of a hardware architecture in accordance with one embodiment of the invention that runs exemplary machine instructions including three dimensional (3D) depth estimation machine instruction section or control logic.

Referring initially to FIG. 1 shows an exemplary embodiment of hardware architecture in accordance with one embodiment of the invention that runs exemplary machine instructions or control logic including 3D depth estimation machine instruction section or control logic. In particular, FIG. 1 shows an exemplary machine vision system 1 including a computer or control system 3, power supply 4, input/output system 5, processor 7, random access memory (RAM) 9, data storage unit 11, machine instructions or alternatively control logic (hereinafter referred to as "machine instruction section") 13 stored on the data storage unit 11, graphical processing unit (GPU) 15, user input system 19 (e.g., for some embodiments, this might include a keyboard and/or graphical pointing device such as a mouse (not shown) or in other embodiments this might be a programmer's input system used for various tasks including programming, diagnostics, etc; in others this might be a maintenance facility's user input system that is used to perform maintenance or upgrade tasks), an optional display 17 (e.g., used with applications such as described with regard to the input system 19), and either two digital imager systems 21, 23 or a single digital imager system, e.g., 21, which is fixed or moved to different perspectives and having different settings with respect to an overlapping field of view with target structures (see FIG. 2). Control system 3 controls timing of the digital imager systems (21, 23) which are synchronized by the control section 3 to take pairs of images simultaneously or substantially simultaneously. Where camera field of view objects or structures are very distant, the digital imager systems 21, 23 operations may require modification such by limiting exposure time to smaller time periods.

Embodiments of the invention can use a single camera but modifications to aspects of the invention would be required. For example, a single camera embodiment that is moving in a static environment (or vice versa) can be used to create a map or 3D model of static objects (e.g., buildings, forests, mountains, street signs, or other fixed objects). Such a single camera embodiment would need additional processing elements which would filter out non-static environment elements that were moving. A single camera embodiment would require multiple images but can also use a beam splitter to generate two separate images simultaneously.

An embodiment of the invention can be installed on a vehicle so that the digital imager systems (e.g., 21, 23) are mounted in the vehicle (not shown) directed to a field of view useful to the mobile application such as, e.g., mounted on a forward section or rear section of the vehicle to provide machine vision or another vehicle which provided a sensor capability for use with the mobile system. Some imagers can be fixed such as with respect to a vehicle section thus providing a known reference with respect to each other. Some embodiments can include actuators (not shown) which move the digital imager systems (e.g. 21, 23) to focus on overlapping fields of view along with equipment which tracks camera orientation with respect to each other and a platform the cameras are mounted upon and which uses 3D model data output by an embodiment of the invention (e.g., navigation and/or steering system 16A which can include inertial measuring units (IMU) or inertial navigation units that includes a virtual reference framework for determining relative location, camera orientation with regard to external georeferenced frames, etc). In particular, one example can include a mobile application that can include primary or secondary machine vision system 1 which is used in conjunction with on board systems such as guidance and navigation or maneuvering control 16A or other systems 16B that interact with machine vision systems 1 such as disclosed herein. Other applications can include fixed site systems including facial recognition systems or other systems that use object or image classifier systems.

Figure 2:
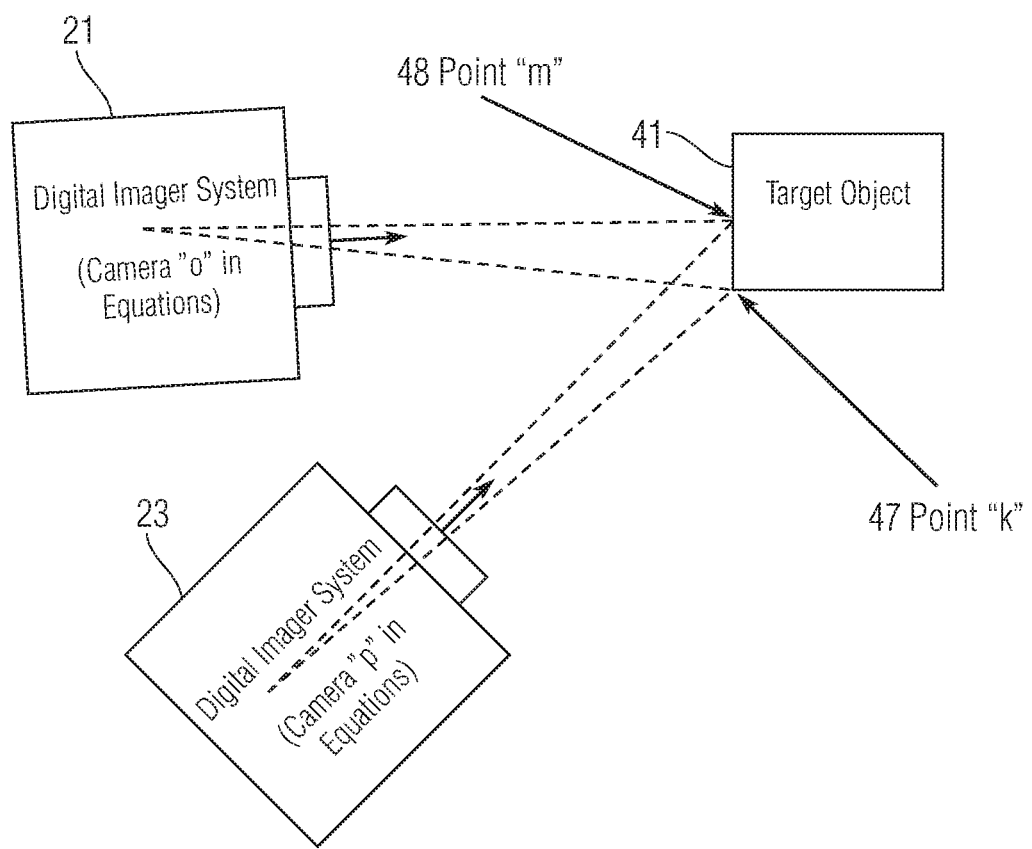
FIG. 2 shows an exemplary setup of a digital imager system and a target 3D object with unknown depth with respect to each imager system location.

FIG. 2 shows an exemplary setup of several digital imager systems 21, 23 and a target 3D object with unknown depth with respect to each imager system location. Embodiments can include camera configurations which are oriented at an angle or a pose with respect to each other or can be aligned to have parallel camera poses, orientations or imaging planes. The first digital imager system 21, referred herein as camera "o" below, is positioned with a field of view of a target object (or structures) 41 that includes one or more arbitrary distinctive feature of the object or structure, e.g. "k" 47 (e.g. a corner in this example) and "m" 48 (another arbitrary point of the object or structure of interest. The second digital imager system 23, referred herein as camera "p" below, is positioned with different camera settings and/or perspective field of view of the target object (or structures) 41 including the same or similar distinctive feature(s), e.g. "k" 47 and "m" 48. The object or structure viewed by both cameras will be the same object or structure but the viewed features will likely be different due to different perspective(s), poses, blur, etc.

Figure 3:
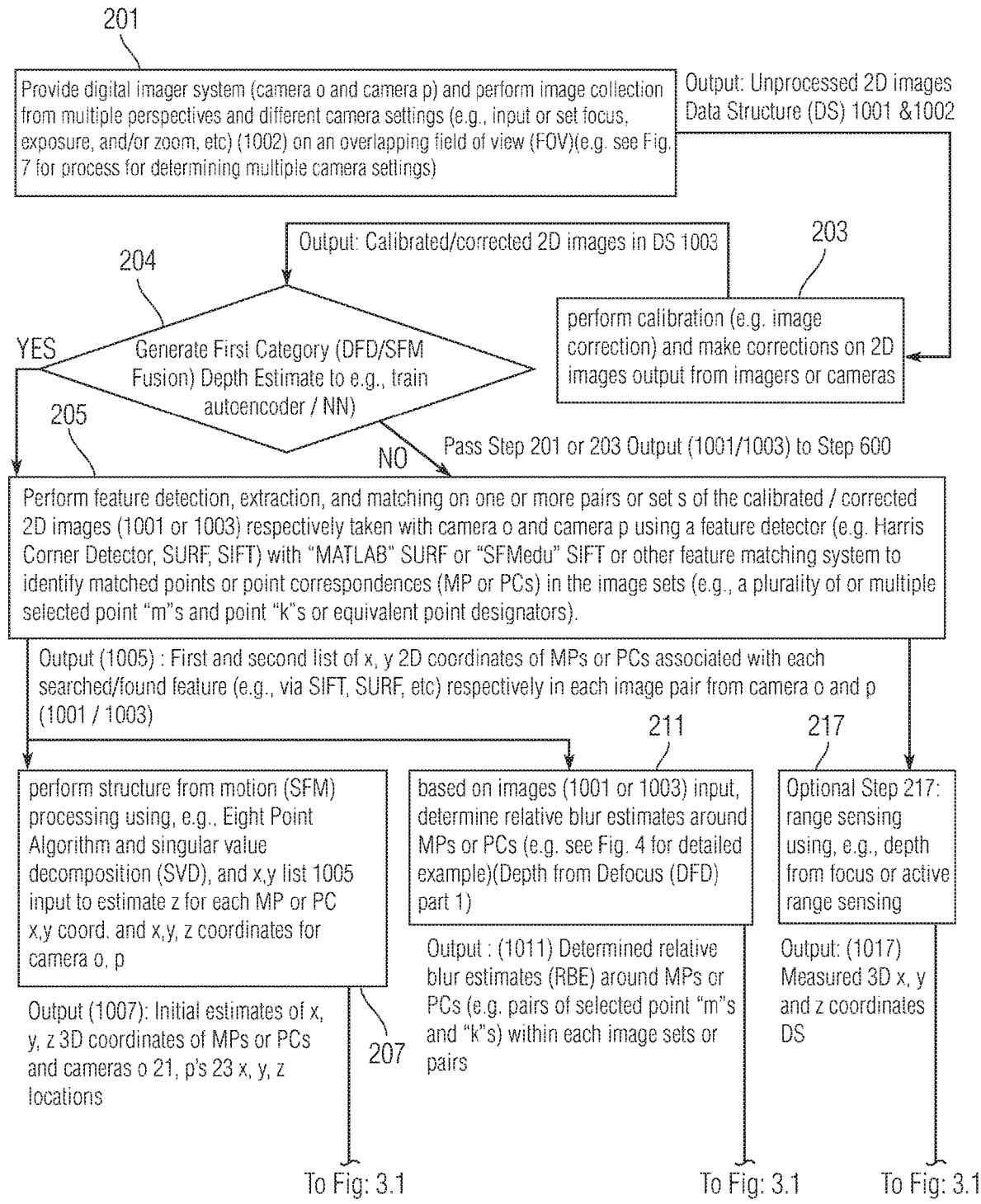
FIGS. 3, 3.1 and 3.2 show an exemplary process executed at least in part by exemplary machine instructions and hardware (e.g., see FIGS. 1, 8A, and 8B) to generate a 3D structure data file from 2D image input into an exemplary application such as a navigation and steering system.

Referring to FIGS. 3, 3.1 and 3.2, an exemplary process is shown executed at least in part by exemplary machine instructions section 13 and machine vision systems 1 to generate a 3D structure data file from at least two two-dimensional (2D) images. As noted in FIGS. 1 and 2, an exemplary embodiment can include digital imager systems 21, 23 that are used to take multiple 2D images at different locations with different camera settings (e.g., focus, exposure, zoom, etc). Generally, embodiments can also include control system 3 which receives these images and performs a variety of processing steps then outputs 3D model of structures which were imaged or captured in the 2D images from different perspectives. Processing steps can include characterizing various optical aberrations or characteristics of the camera that is used. Note more than one camera may be used but each camera will have to have been characterized or have optical settings known in advance of additional processing steps and in at least some cases the cameras will require calibration to predetermined settings (e.g., focus, exposure, zoom, etc). Some of the required calibration steps may be skipped through algebraic method as shown in Equation 2 derivation, or by using an active range sensor. Images can be captured from different positions and/or a same position with different camera settings. Optional active depth sensing system (e.g. LIDAR, sonar, radar, etc) may be included.

At Step 201: Provide digital imager system (camera o 21 and camera p 23) and perform image collection from multiple perspectives and different camera settings (e.g., focus, exposure, and/or zoom, etc) on an overlapping field of view (FOV) (see, e.g., FIGS. 7 and 7.1 for method of camera setting selections). In particular, at this step determine camera calibration and correct optical aberrations in 2D images output from camera (e.g,. pixel values, coordinates, etc)) settings for imager shape and orientation, characterize point spread function, magnification and other non-ideal image characteristics for each camera settings (e.g. e.g., focus, aperture opening/size, exposure, zoom, etc)). Step 201 Output: Unprocessed 2D images data structure (DS) 1001.

At Step 203: perform calibration (e.g. image correction) and make corrections on 2D images (1001) output from digital imager systems (camera o 21 and camera p 23) from Step 201. In particular, determine camera calibration and correct optical aberrations in 2D images output from camera (e.g., pixel values, coordinates, etc)) settings for imager shape and orientation, characterize point spread function, magnification and other non-ideal image characteristics for each camera settings (e.g. e.g., focus, aperture opening/size, exposure, zoom, etc)). Example can include an input image that is distorted (e.g., skewed, stretched, etc) and an output can include undistorted output. MATLAB® "Camera Calibrator" and "undistortImage" can be used to perform this step. Step 203 Output: Calibrated/corrected 2D images DS (1003).

Figure 5:
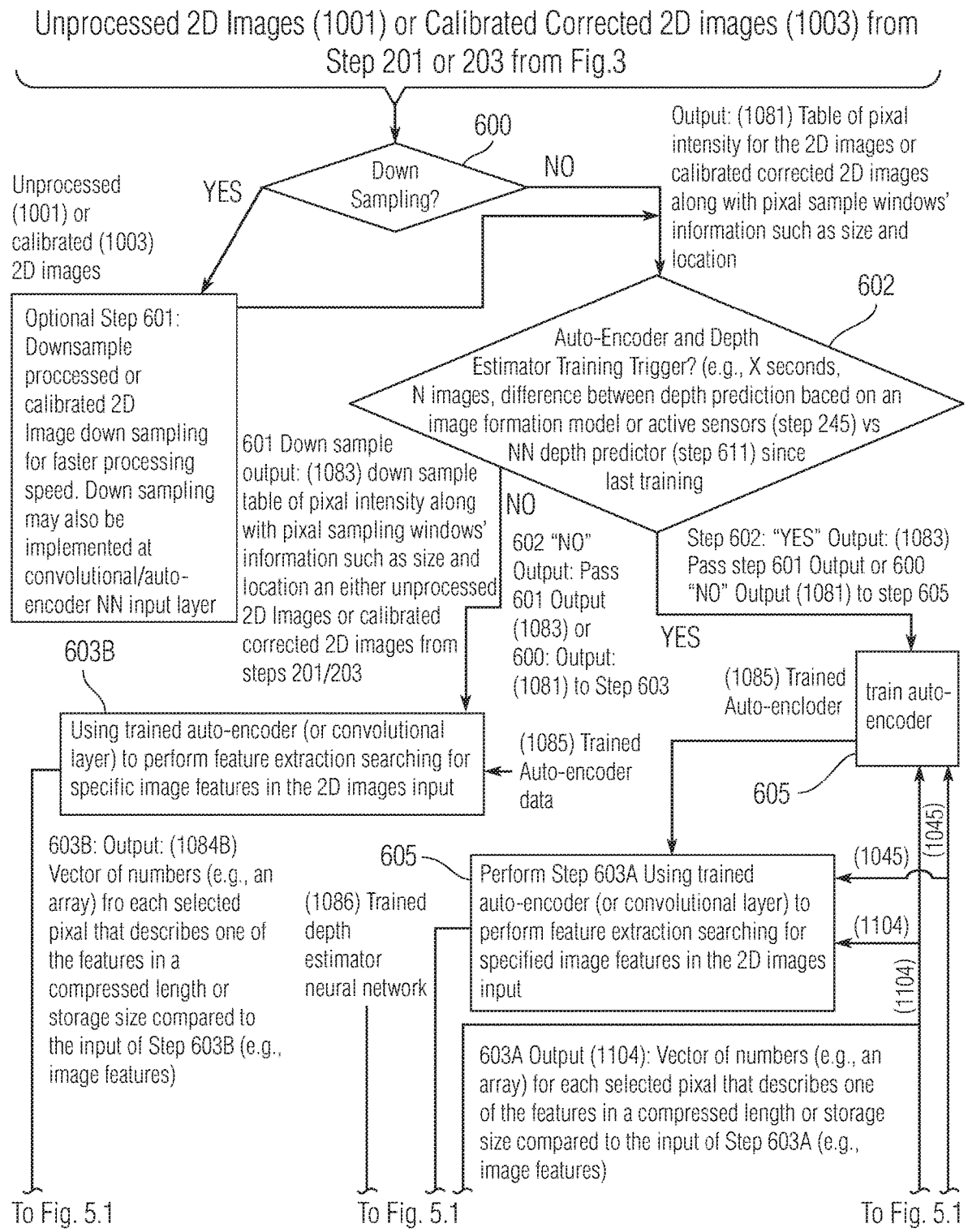
FIGS. 5 and 5.1 show an exemplary process executed at least in part by exemplary machine instructions and hardware using output of processing from the process shown in FIGS. 3, 3.1 and 3.2 to perform monocular depth estimation with online training of an exemplary machine learning system (e.g., neural network)

At Step 204, determine if a first category (e.g., DFD/SFM fusion) depth estimate (e.g., multi-view depth estimation) will be generated; if yes, then continue processing at Step 205; if no, then pass the 201/203 image outputs 1001 or 1003 to Step 600 (FIGS. 5 and 5.1).

At Step 205: Perform feature detection, extraction, and matching on one or more pairs or sets of the calibrated/ corrected 2D images (1001 or 1003) respectively taken with camera o 21 and camera p 23 using a feature detector (e.g. Harris Corner Detector, SURF, SIFT with "MATLAB" or "SFMedu" or other feature matching system) to identify matched points or point correspondences (MP or PCs) in the image sets (e.g., a plurality of or multiple selected point "m"s and point "k"s or equivalent point designators). SIFT examples are described in U.S. Pat. No. 6,711,293; see also MATLAB® SURF or SFMedu® SIFT or other feature matching systems to identify and output 2D coordinates for matched points or point correspondences (MP or PCs) associated with unique features in the image sets. Step 205 Output (1005): First and second list of x, y 2D coordinates of matched MPs or PCs associated with each searched/found feature (e.g., via SIFT, SURF, etc) respectively in each image pair (1001/1003).

In at least some embodiments, SIFT feature descriptors are matched in an image. Exemplary feature descriptors that feature detectors can use to search images for image feature matching can include corner angles or ninety degree angled image elements or pixel combinations as well pixel gradient combinations or transition sequences. One embodiment uses SIFT at Step 205 which includes an exemplary method to detect distinctive, invariant image feature points, which can later be matched between images to find MPs or PCs (feature match points, match points, matched feature points, or image feature match points (used interchangeably herein). SIFT searched image feature descriptors can be used to identify MPs or PCs to perform tasks such as object detection and recognition, or to compute geometrical transformations between images. In particular, Step 205 outputs a list of image or pixel x, y coordinates for detected feature points in a $X_{2D\ Camera\ o\ Point\ m}$ (x coordinate of an arbitrary point m and in an image taken by camera o 21), $Y_{2D\ Camera\ o\ Point\ m}$ (y coordinate of an arbitrary point n in an image taken by camera o 21) format and a set of similar feature points, $X_{2D\ Camera\ p\ Point\ m}$ (x coordinate of an arbitrary point m in an image taken by camera p 23), $Y_{2D\ Camera\ p\ Point\ m}$ (y coordinate of an arbitrary point m in an image taken by camera p 23) that may be assumed as the same object in different 2D images which are stored as MPs or PCs coordinate data.

At Step 207: perform SFM processing using, e.g., an Eight Point Algorithm, singular value decomposition (SVD), and x, y list 1005 input to estimate z for each MP or PC x, y coordinates in a reference coordinate system; also estimate x, y, z coordinates for camera o 21, p 23 by assuming one of the cameras is at an origin (0,0) of the reference coordinate system and relative location of the second camera with respect to the first camera is determined with the Eight Point Algorithm (e.g., see Richard Hartley and Andrew Zisserman, *Multi-View Geometry in Computer Vision*; Richard Hartley, *In Defense of Eight Points Algorithm*). In particular, SFM reconstruction is done in this embodiment using an exemplary Eight Point Algorithm to estimate $Z_{SFM\ camera\ o\ point\ m}$, depth of arbitrary feature match point m with respect to camera o 21 and $Z_{SFM\ camera\ p\ point\ m}$, depth of arbitrary feature match point m with respect to camera p 23, which outputs an initial estimate of $X_{2D\ Camera\ o\ Point\ m}$, $Y_{2D\ Camera\ o\ Point\ m}$, $Z_{SFM\ camera\ o\ point\ m}$, $X_{2D\ Camera\ p\ Point\ m}$, $Y_{2D\ Camera\ p\ Point\ m}$, $Z_{SFM\ camera\ p\ point\ m}$ 3D coordinates of matched feature points. From a list of point correspondences produced by Step 205, select another arbitrary point correspondences, identified as point k, and identify its coordinates as $X_{2D\ Camera\ p\ Point\ k}$, $Y_{2D\ Camera\ p\ Point\ k}$, $Z_{SFM\ camera\ p\ point\ k}$. Step 207 Output (1007): Initial estimates of x, y, z 3D coordinates of MP or PC for images (1001 or 1003) input for processing at Step 209 and camera o 21 and p 23 x, y, z locations.

Generally, at Step 209: define or use provided first polynomial algorithm (PA) (e.g., see Eq. 1) describing a projective camera model including relationships between MPs or PCs and camera o 21, camera p 23) within a common reference frame (see code appendix (CA)). Output (1009): First and Second Ratios of Depth (RoD) data; list of coefficient and corresponding variables in the first PA describing the projective camera model. In this example, coefficients describe relationship between 3D coordinates of arbitrary sets or pairs of combinations of MPs or PCs (e.g. coefficients are functions of 2D x, y coordinates of MPs or PCs); and first PA (e.g., at least part of Eq. 1).

In particular, at exemplary Step 209: define and/or use polynomial equation describing known and unknown geometric relationships between feature match points k and m as well as camera o 21 and p 23) (one polynomial relationship for each arbitrary feature match point k and m) between arbitrary point correspondence m and other arbitrary point correspondences k based on projective geometry, where k≠m. In this example, Equation 1 includes a projective geometry equation that defines relationships (e.g., distances) between sets of 3D coordinates (e.g., point k and m) of two objects and sets of 2D coordinates of the two objects within two imaging planes associated with a pair of images of the object taken by two pinhole cameras where $X_{2D\ Camera\ o\ Point\ m}$, $Y_{2D\ Camera\ o\ Point\ m}$, $X_{2D\ Camera\ p\ Point\ m}$, $Y_{2D\ Camera\ p\ Point\ m}$, $X_{2D\ Camera\ o\ Point\ k}$, $Y_{2D\ Camera\ o\ Point\ k}$, $X_{2D\ Camera\ p\ Point\ k}$, $Y_{2D\ Camera\ p\ Point\ k}$ information is obtained from feature point matching and ratios of depth. In at least one embodiment, a number of variables in exemplary projective geometry algorithm such defined by Equation 1 are reduced by substituting actual measured values with numeric values obtained by measurements such as from Step 207 which generates 2D x, y coordinates that are then used to eliminate or simplify symbolic variables and therefore reduce numbers of powers used in the projective geometry algorithm.

For example, RoDs $R_{point\ k}$ and $R_{point\ m}$ have actual values substituted into them from Step 207 in order to eliminate $Z_{SFM\ camera\ p\ 23\ point\ k}$ and $Z_{SFM\ camera\ p\ 23\ point\ m}$. In an exemplary initial estimate of $Z_{SFM\ camera\ o\ point\ m}$ (estimate of depth of point m with respect to camera o 21) is assumed correct up to an unknown scale, and $R_{Point\ m}$ ratios of $Z_{SFM\ camera\ o\ point\ m}$ with respect to one camera and $Z_{SFM\ camera\ p\ point\ m}$ with respect to another camera for each set of feature match points (sets of pixel x, y) between pairs of image are calculated. When SFM estimate of $Z_{SFM\ camera\ o\ point\ m}$ and $Z_{SFM\ camera\ p\ point\ m}$ are very large values relative to the distance between camera o 21 and camera p 23 with positions that differ only in translation, the depth ratio is close to 1. For arbitrary points k and m, exemplary RoDs are calculated below as a part of Equation 1.

$$D_{Camera\ o\ Point\ k-m}^2 - D_{camera\ p\ Point\ k-m}^2 = 0 \qquad \text{Eq. 1}$$

Where in an exemplary implementation of Eq. 1, a first RoD defined camera p 23 over camera o 21 to point k and a second ratio defined by depth from camera p 23 over camera o 21 to point m:

$$R_{Point\ k} = \frac{Z_{SFM\ camera\ p\ point\ k}}{Z_{SFM\ camera\ o\ point\ k}} \quad \text{(First Ratio of Depth)}$$

$$R_{Point\ m} = \frac{Z_{SFM\ camera\ p\ point\ m}}{Z_{SFM\ camera\ o\ point\ m}} \quad \text{(Second Ratio of Depth)}$$

Eq. 1 can be further defined as functions of $X_{2D\ Camera\ o\ Point\ k}$, $Y_{2D\ Camera\ o\ Point\ k}$, $X_{2D\ Camera\ o\ Point\ m}$, $Z_{SFM-DFD\ Camera\ o\ point\ m}$, $Y_{2D\ Camera\ o\ Point\ m}$, $Z_{SFM-DFD\ Camera\ o\ point\ k}$, $R_{point\ k}$ and $R_{Point\ m}$ using equations below by algebraic substitution to obtain coefficient polynomials of $Z_{SFM-DFD\ Camera\ o\ point\ k}$ and $Z_{SFM-DFD\ Camera\ o\ point\ m}$ as unknown variables; and where:

$$D_{Camera\ oPoint\ k-m}^2 = (X_{3D\ Camera\ o\ Point\ k} - X_{3d\ Camera\ o\ Point\ m})^2 +$$
$$(Y_{3D\ Camera\ o\ Point\ k} - Y_{3d\ Camera\ o\ Pointm})^2 +$$
$$(Z_{3D\ Camera\ o\ Point\ k} - Z_{3d\ Camera\ o\ Point\ m})^2$$

$$D_{Camera\ p\ Point\ k-m}^2 = (X_{3D\ Camera\ p\ Point\ k} - X_{3d\ Camera\ p\ Point\ m})^2 +$$
$$(Y_{3D\ Camera\ p\ Point\ k} - Y_{3d\ Camera\ p\ Pointm})^2 +$$
$$(Z_{3D\ Camera\ p\ Point\ k} - Z_{3d\ Camera\ p\ Point\ m})^2$$

$$X_{3D Camera\ o\ Point\ k} = X_{2D\ Camera\ o\ Point\ k} \times Z_{SFM-DFD\ Camera\ o\ point\ k}$$

$$Y_{3D Camera\ o\ Point\ k} = Y_{2D\ Camera\ o\ Point\ k} \times Z_{SFM-DFD\ Camera\ o\ point\ k}$$

-continued $X_{3DCamera\ o\ Point\ m} = X_{2D\ Camera\ o\ Point\ m} \times Z_{SFM-DFD\ Camera\ o\ point\ m}$ $Y_{3DCamera\ o\ Point\ m} = Y_{2D\ Camera\ o\ Point\ m} \times Z_{SFM-DFD\ Camera\ o\ point\ m}$ $X_{3DCamera\ p\ Point\ k} = X_{2D\ Camera\ p\ Point\ k} \times Z_{SFM-DFD\ Camera\ 2\ point\ k}$ $Y_{3DCamera\ p\ Point\ k} = Y_{2D\ Camera\ p\ Point\ k} \times Z_{SFM-DFD\ Camera\ 2\ point\ k}$ $X_{3DCamera\ p\ Point\ m} = X_{2D\ Camera\ p\ Point\ m} \times Z_{SFM-DFD\ Camera\ 2\ point\ m}$ $Y_{3DCamera\ p\ Point\ m} = Y_{2D\ Camera\ p\ Point\ m} \times Z_{SFM-DFD\ Camera\ p\ point\ m}$ $Z_{SFM-DFD\ Camera\ p\ point\ k} = R_{Point\ k} \times Z_{SFM-DFD\ Camera\ o\ point\ k}$ $Z_{SFM-DFD\ Camera\ p\ point\ m} = R_{Point\ m} \times Z_{SFM-DFD\ Camera\ o\ point\ m}$ In other words, a RoD z for each pair of MPs or CPs (e.g., $R_{point\ k}$ and $R_{point\ m}$) and an equation of distance between two pairs of MPs or CPs (e.g., in Eq. 1) is provided or created which is then used to populate sets of a first polynomial relationship (e.g., first PA) between each set of MP or PC correspondences between image pairs (e.g., stored in a data structure in computer based implementations) based on projective geometry. Coefficients of exemplary polynomial(s) or PAs can be derived from selection of two separate MPs or CPs or said matching x, y pixel coordinates and RoDs from each camera.

Concurrent with Steps 207, 209, at Step 211: based on pairs images (1001 or 1003) determine relative blur estimates (RBEs) around MPs or PCs (see FIGS. 4 and 4.1 for a detailed example) (DFD part 1). Step 211 Output (1011); Determined RBEs around MPs or PCs within each image sets or pairs DS.

Generally, processing at Step 211 can include creating or determining RBEs around each MPs or CPs (e.g., see FIG. 4 for further exemplary details) to perform a portion of an exemplary DFD process which includes taking the sharp blurred image that can be modeled as a convolution of a sharp, focused image with the point spread function (PSF), e.g., Gaussian PSF, of the exemplary imaging system. The exemplary blur radius can be modeled as a square of a variance of a Gaussian PSF. In one example, DFD in part can be done using the Gaussian PSF can include use of image processing techniques based on use of Gaussian blur (also known as Gaussian smoothing). Blur results can be produced by blurring an image by a Gaussian function. In some situations, both the PSF and an exemplary focused image can be recovered by blind deconvolution technique from a single image. However, sharpness variation within a single image may introduce errors to the blind deconvolution algorithms.

This exemplary RBE ($\Delta\sigma_{Point\ m}^2$) is a function of blur radiuses ($\sigma_{Point\ m\ Camera\ o}^2 - \sigma_{Point\ m\ Camera\ p}^2 = \Delta\sigma_{Point\ m}^2$), where $\sigma_{Point\ m\ camera\ o}$ is a near focused blur radius and $\sigma_{Point\ m\ Camera\ p}$ is a far focused blur radius. Exemplary measure of blur radius from an imager system with assumed Gaussian PSF can be defined as the Gaussian PSF standard deviation.

Figure 4:
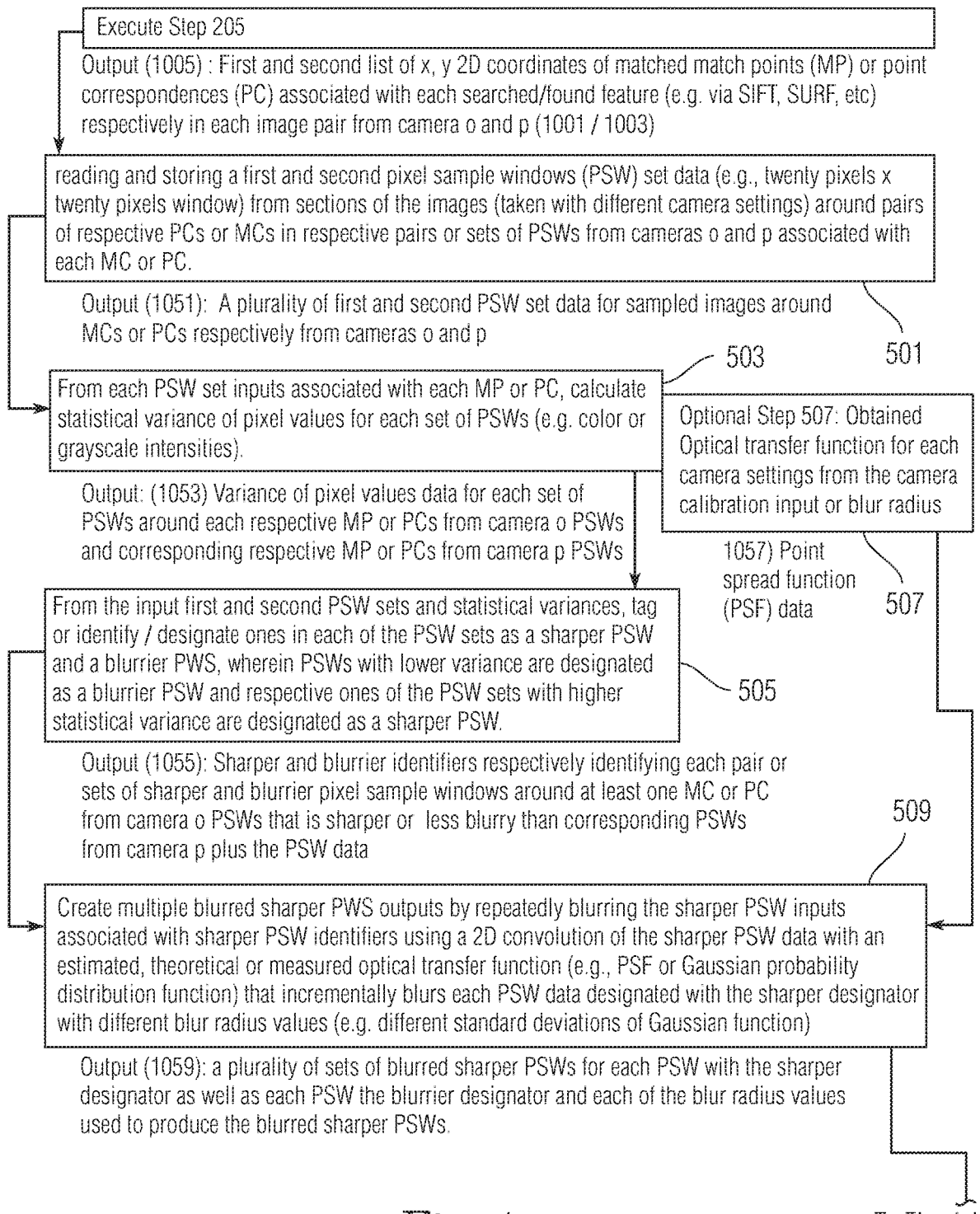
FIGS. 4 and 4.1 show an exemplary process executed at least in part by exemplary machine instructions and hardware to perform robust relative blur estimation associated with at least a portion of FIGS. 3, 3.1 and 3.2.

Step 211 from FIGS. 3, 3.1 and 3.2 is further elaborated in exemplary FIGS. 4 and 4.1. FIGS. 4 and 4.1 provide an exemplary approach for generating RBEs around MP or CP correspondences.

Note, there is inventive significance in obtaining data from depth and RBEs at Steps 207, 209 as well as 211 and 213 for input into later steps. Embodiments of the invention are implemented based on a fusion or hybrid combination of symbolic and numerical method coupled with additional implementations (e.g., use of resultants for computing) which reduce variables or powers of algorithms or equations used in performing SFM and DFD computing which in turn significantly increase performance in addition to enabling use of a combination of SFM and DFD which are normally incompatible. Numeric or scientific computing is usually based on numerical computation with approximate floating point numbers or measured values. Symbolic computation emphasizes exact computation with expressions containing variables that have no given value and are manipulated as symbols hence the name symbolic computation. SFM typically uses a numerical method to minimize computational resources requirement, e.g., the Eight Point Algorithm and SVD. However, in this example, SFM is implemented with RoDs which are variables for a polynomial equation or PA which eliminates variables and, when equations are solved with resultant methods, the overall software system is implemented with a smaller degree or sizes of the polynomial equations used at Step 209, 219, and 221 (calculate resultant). In particular, part of this reduction in size or powers of (and therefore increase of speed) is obtained from use of a first and second RoDs defined in association with Equation 1 where a first RoD is defined by a z coordinate point of a selected feature point minus z coordinate of camera o 21 divided by z coordinate of same feature point z minus z coordinate of camera p 23; the second RoD is defined by a z coordinate point of a selected feature point minus z coordinate of camera o 21 divided by z coordinate of same feature point z minus z coordinate of camera. An exemplary z coordinate is used here to define distance of a point from an imaging plane along an axis that is perpendicular to the imaging plane (e.g., a plane that an imager camera's sensor (e.g., charge coupled device (CCD) falls within)). Use of these RoDs are significant in overall design of various embodiments that are enabled by downsizing polynomial equation size/powers in combination with use of other design elements such as resultant computation. These RoDs are an input to various polynomials or PAs. Thus, the structure and combination of steps herein provides a major increase in processing capacity as well as simplification of equipment and resources, processing scheduling, memory, etc which can be used which in turn decreases cost and size of equipment used in actual implementations. Implementations or examples of this embodiment using lower power implementations can use a degree four equation while existing approaches use degree six or more equations. When attempting to merely use a combination of SFM and DFD without making changes such as described herein, existing approaches have large degrees of equations (e.g., six for symbolic SFM alone not including DFD or using relationship without two data points, etc). When a polynomial equation has roots no greater than four, the roots of the polynomial can be rewritten as algebraic expressions in terms of their coefficients or a closed-form solution. In other words, applying only the four basic arithmetic operations and extraction of n-th roots which is faster to calculate versus using more complex software solutions which requires substantially more time and processing cycles.

At Step 213 (DFD part 2): set or use provided second PA (e.g., see Eq. 2) describing relationships between MPs/PCs and cameras o 21, p 23 based on a thin lens equation with the camera settings (from Step 201), where the second PA also defines relationships between relative blur radius associated with different MPs/PCs and depth z coordinates of MP/PCs; compute relative blur ratio using sets of RBEs divided by each other that is used to cancel an element in the second PA) (e.g. see Eq. 2, see also source code appendix). Step 213 Output (1013): DS with coefficients of multivariate PAs and variables that describe relationship between relative blur radius associated with different MPs or PCs and depth z coordinate of MP and PCs.

Generally, at Step 213, an apparatus can enable setting or use of a provided polynomial relationship between PCs or MPS based on the exemplary thin lens equation. Blind deconvolution can be performed on each of the original pixel sample windows identified as sharper images and the original pixel sample windows identified as blurrier images to produce blind estimate of their PSFs, and the relative blur can be estimated by comparing blind estimate of PSFs.

For example, Equation 2 recites:

$$(\sigma^2_{Point\ k\ Camera\ o} - \sigma^2_{Point\ k\ Camera\ p}) - \quad\quad (Eq.\ 2)$$
$$\left(R_{\sigma^2_{Camera\ o} - \sigma^2_{Camera\ p}}\ Points\ k-m\right) \times$$
$$(\sigma^2_{Point\ m\ Camera\ o} - \sigma^2_{Point\ m\ Camera\ p}) = 0$$

where:

$$\sigma = \rho \times \frac{D}{2} \times \left(\frac{1}{f} - \frac{1}{v} - \frac{1}{Z}\right) =$$

$$\beta \times \left(\frac{1}{F} - \frac{1}{Z}\right) \text{ (Thin Lens Equation)}$$

$$\frac{1}{f} - \frac{1}{v} = \frac{1}{F}$$

$$\frac{1}{F_{Camera\ o}} = \frac{1}{\text{focal plane distance from camera } o \text{ center}}$$

$$\sigma^2_{Point\ k\ Camera\ o} = \beta \times \left(\frac{1}{F_{Camera\ o}} - \frac{1}{Z_{SFM-DFD\ Camera\ o\ point\ k}}\right)^2$$

$$\sigma^2_{Point\ k\ Camera\ o} - \sigma^2_{Point\ k\ Camera\ p} = \Delta\sigma^2_{Point\ k}$$

$$\frac{1}{F_{Camera\ o}} = \frac{1}{\text{focal plane distance from camera } o \text{ center}}$$

(Thin lens equation with substitution of references to camera o 21 and pixel match point k with same features)

$$\sigma^2_{Point\ m\ Camera\ o} = \beta \times \left(\frac{1}{F_{Camera\ o}} - \frac{1}{Z_{SFM-DFD\ Caemra\ o\ point\ m}}\right)^2$$

$$\sigma^2_{Point\ m\ Camera\ o} - \sigma^2_{Point\ m\ Camera\ p} = \Delta\sigma^2_{Point\ m}$$

$$\frac{1}{F_{Camera\ p}} = \frac{1}{\text{focal plane distance from camera } p \text{ center}}$$

(Thin lens equation with substitution of references to cameras o 21 and pixel match point m with same features)

$$\sigma^2_{Point\ k\ Camera\ p} = \beta \times \left(\frac{1}{F_{Camera\ p}} - \frac{1}{Z_{SFM-DFD\ Camera\ p\ point\ k}}\right)^2$$

$$\sigma^2_{Point\ k\ Camera\ o} - \sigma^2_{Point\ k\ Camera\ p} = \Delta\sigma^2_{Point\ k}$$

$$\frac{1}{F_{Camera\ p}} = \frac{1}{\text{focal plane distance from camera } p \text{ center}}$$

(Thin lens equation with substitution of references to cameras p and pixel match point m with same features)

$$\sigma^2_{Point\ m\ Camera\ p} =$$

$$\beta \times \left(\frac{1}{F_{Camera\ p}} - \frac{1}{Z_{SFM-DFD\ Caemra\ p\ point\ m}}\right)^2$$

$$\sigma^2_{Point\ m\ Camera\ o} - \sigma^2_{Point\ m\ Camera\ p} = \Delta\sigma^2_{Point\ m}$$

$$Z_{SFM-DFD\ Camera\ p\ point\ k} = R_{Point\ k} \times Z_{SFM-DFD\ Camera\ o\ point\ k}$$

$$Z_{SFM-DFD\ Camera\ p\ point\ m} = R_{Point\ m} \times Z_{SFM-DFD\ Camrea\ o\ point\ m}$$

(Thin lens equation with substitution of references to camera p 23 and pixel match point k with same features)

Ratio of relative $blur R_{\sigma^2_{Camera\ o} - \sigma^2_{Camera\ p}\ Points\ k-m}$ is:

$$R_{\sigma^2_{Camera\ o} - \sigma^2_{Camera\ 2}\ Points\ k-m} =$$

$$\frac{\sigma^2_{Point\ k\ Camera\ o} - \sigma^2_{Point\ k\ Camera\ p}}{\sigma^2_{Point\ m\ Camera\ o} - \sigma^2_{Point\ m\ Camera\ p}}$$

Where Equation 2 is expressed in terms of the following variables: $X_{2D\ Camera\ o\ Point\ k}$, $Y_{2D\ Camera\ o\ Point\ k}$, $X_{2D\ Camera\ o\ Point\ m}$, $Z_{SFM-DFD\ Camera\ o\ point\ m}$, $Y_{2D\ Camera\ o\ Point\ m}$, $Z_{SFM-DFD\ Camera\ o\ point\ k}$, $R_{Point\ k}$ and; $\beta$ is a scaling constant for an equation that relates camera focus plane, depth of a point and blur radius around the point. $R_{Point\ m}$ and $R_{Point\ m}$ are substituted into Equation 2 in Step 219

In Subarrao's DFD algorithm, $\beta$ is determined by offline camera calibration, but in this case, the scaling variable is canceled out by algebraic calculation. Other camera calibration parameters for both SFM and DFD may also be canceled out or calculated algebraically, and by using depth from focus or active range sensor (e.g. LIDAR) data. Data from SFM can be used to perform camera calibration for DFD and vice versa At optional Step 217: determine depth or z coordinates for structures or objects in from focus and active range sensing. Optional Step 217 can be performed using laser, infrared, ultrasonic, radar, etc systems to obtain range to structure or object data. Step 217 Output (1017): Measured 3D x, y and z coordinates DS which is input for Step 219 which can be used with Step 219 to increase accuracy depth estimations.

Optional PA Simplification Step 219: Run PA simplification script to perform variable elimination or reduction of system of equations (SoE) (First and Second PAs) variables including performing data entry into Eq. 1 and Eq. 2 SoEs to output a First Simplified SoEs (FSSoE) including by substituting First and Second RoDs data into Eq. 1 and 2 to eliminate a First and Second Z of Four Z variables; also output a list of FSSOE coefficients; see code appendix. Output of Step 219 (1019): a matrix list of coefficients of the Step 219 FSSoEs multivariate polynomials for some or all valid set combinations of MPs and PCs; also output the FSSoE.

Generally, Step 219 can include providing or using a system of multivariate polynomials which includes of Equations 1 and 2 (see also code appendix). In this embodiment, each two or more MPs or PCs (e.g. arbitrary point m and point p) in two or more images can generate a pair of equations such as described herein or above. The exemplary equations can be set such that each equations contains a common Z variable to be solved (e.g. $Z_{SFM-DFD\ Camera\ o\ point\ m}$).

At Step 221: Use Sylvester Resultant (e.g., in matrix) to eliminate a Third Z of the Four Z variables to create a Second Simplified SoEs (SSSoE) of univariate polynomials. Step 221 Output: (1021): SSSoEs to systems of polynomials from Step 219 where the coefficients of multivariate polynomials describe relationships between 3D coordinates of MPs or PCs.

With respect to Step 221, multivariate polynomial from each pair of matched point containing the common Z variable (e.g. $Z_{SFM-DFD\ Camera\ o\ point\ m}$) are defined or transformed into a univariate polynomial with common Z (e.g $Z_{SFM-DFD\ Camera\ o\ point\ m}$) as unknown variable and a same root as the multivariate polynomial using resultant method (e.g. Sylvester Resultant). A system of univariate polynomial equations containing a common z variable (e.g. $Z_{SFM-DFD\ Camera\ o\ point\ m}$) to be solved is formed from multivariate equations relating each matched point, camera setting, and camera p 23 ositions, as shown below.

$$\begin{bmatrix} \kappa_{11}Z^4_{Camera\ o\ Point\ m} + \kappa_{12}Z^3_{Camera\ o\ Point\ m} + \kappa_{13}Z^2_{Camera\ o\ Point\ p} + \kappa_{11}Z_{Camera\ o\ Point\ p} + 1 \\ \vdots \\ \kappa_{n1}Z^4_{Camera\ o\ Point\ m} + \kappa_{n2}Z^3_{Camera\ o\ Point\ m} + \kappa_{n3}Z^2_{Camera\ o\ Point\ m} + \kappa_{n1}Z_{Camera\ o\ Point\ m} + 1 \end{bmatrix} = 0 \qquad \text{Eq. 4A}$$

or, as function of inverse depth $Z_{Camera\ o\ Point\ m}^{-1}$, $$\begin{bmatrix} \kappa_{11} + \kappa_{12}Z^{-1}_{Camera\ o\ Point\ m} + \kappa_{13}Z^{-2}_{Camera\ o\ Point\ m} + \kappa_{11}Z^{-3}_{Camera\ o\ Point\ m} + Z^{-4}_{Camera\ o\ Point\ m} \\ \vdots \\ \kappa_{n1} + k_{n2}Z^{-1}_{Camera\ o\ Point\ m} + \kappa_{n3}Z^{-2}_{Camera\ o\ Point\ m} + \kappa_{n1}Z^{-3}_{Camera\ o\ Point\ m} + Z^{-4}_{Camera\ o\ Point\ m} \end{bmatrix} = 0 \qquad \text{Eq. 4B}$$

where $K_{xz}$ is a coefficient of the resultant polynomial.

At Step 245: Solve depth for each MP or PC associated with each overdeterminded SSSoE from Step 221. In one implementation, a single best fit polynomial can be generated by averaging the coefficients for each power of z and solved a set of z solutions. Then, determine a best solution for each MPs or PCs multiple possible solutions by back-substituting each possible solution into to each of the set of Sylvester Resultant polynomial from Step 221 and calculating the mean of a result of the back substitutions, while excluding outliers of the back-substitutions (m =trimmean (X,percent), to obtain an algebraic or geometric (A/G) error estimate (e.g., errors obtained when substituting depth estimate into FSSoE and SSSoE) of each possible depth estimate (e.g., depth estimate is a solution for z coordinate for each x, y coordinate set with lowest error located around focal point of each camera, e.g., inputting the possible solutions into Sylvester Resultant polynomial and selecting one of the solutions closest to zero). Step 245 Output (1045): A/G Error Estimate and either Unprocessed 2D Images (1001) or Calibrated Corrected 2D images (1003) from Steps 201/203 and 3D Model output including First Category Plurality of x, y, z 3D coordinates from SFM, DFD, and optionally depth from focus and active sensing DS where z is estimated depth. Step 245 output is received by processing steps described with respect to FIGS. 5 and 5.1.

Generally with respect to Step 245, a single solution of z (e.g. $Z_{SFM\text{-}DFD\ Camera\ o\ point\ m}$) is selected as the optimal estimated of z (e.g. $Z_{SFM\text{-}DFD\ Camera\ o\ point\ m}$) from multiple possible polynomial real value of roots. The best fit for multiple solutions to select a Z solution is selected from multiple real value of z roots so that selected solution root has a lowest deviation or error located around the focal point of each camera (Digital Imager System o 21 and p 23) for each X and Y coordinate of matched pixels ($X_{2D\ Camera\ o\ Point\ m}$, $Y_{2D\ Camera\ o\ Point\ m}$) thereby determining and saving a selected z solution for each match point(e.g. point m) or said matching pixels and saving a resulting x, y and z data into a second data structure for each matched point to generate said three dimensional model. Alternatively, an implementation that solve each polynomial algorithm in Output (1021) before performing statistical inference to obtain a depth estimate may requires more computational resources (e.g CPU processing time, RAM). Note that an overdetermined system of algorithms describing relationships between MPs or PCs is necessary to perform statistical inference for an accurate depth estimate for each MP or PC from noisy measurements (e.g. feature matching in Step 205). By setting the relationships between MPs and PCs as univariate polynomials in the exemplary Step 245, a single variable can be used to describe possible solutions that are derived from relationships with arbitrarily selected MPs or PCs. The selected MPs or PCs x, y coordinate locations do not have to be adjacent or near to each other. The method enables flexible down sampling of MPs or PCs, which in turn enables better computer resources management (e.g. more flexible requirement for Computer System RAM Memory, more flexible requirement for Data Storage Unit, more flexible requirement for processor or GPU utilization, the ability to utilize parallel processes and asynchronous processes). Calculation of average number can be performed with parallel processing.

The following alternative and optional steps may be integrated to the current implementation. depth from focus or active range sensing can be used to determine depth of an object in 3D space, to aid camera calibration and use it to solve depth polynomial at other point coordinates in the images. Depth from focus finds the camera setting that yields the sharpest image of an object by matching the focal point of the imager hardware to the location of the object. In an optional or alternative steps, if a value of depth Z is known through active depth sensing measurements or depth from focus algorithm, an unknown variable (e.g. $Z_{SFM\text{-}DFD\ Camera\ o\ point\ m}$) in the above equations can be substituted with the measured/known depth, provided that the equations are set such that it is consistent and have a real solution. Polynomials that relate multiple unknown depths and measured depths (e.g Output: (1017) from active sensing in Step 217) also can be constructed. This exemplary method combines depth cues from SFM, DFD, depth from focus and active range sensing as a system of polynomials, and to estimate depth based on the system of polynomials. For example, for an arbitrary point k of known depth, and points i and j of unknown depth an exemplary equations relating unknown and known points below may be used, and used in Equations 1 and 2 as previously described:

$$R_{point\ i} = \frac{Z_{SFM\ camera\ o\ point\ i} \times Z_{SFM\ camera\ p\ point\ k}}{Z_{SFM\text{-}camerap\ point\ i} \times Z_{SFM\ camera\ o\ point\ k}} \times \frac{Z_{measured\ camera\ o\ point\ k}}{Z_{measured\ camera\ p\ point\ k}}$$

$$R_{point\ j} = \frac{Z_{SFM\ camera\ o\ point\ j} \times Z_{SFM\ camera\ p\ point\ k}}{Z_{SFM\ camera\ p\ point\ j} \times Z_{SFM\ camera\ o\ point\ k}} \times \frac{Z_{measured\ camera\ o\ point\ k}}{Z_{measured\ camera\ p\ point\ k}}$$

where an exemplary $Z_{measured\ camera\ o\ point\ k}$ is any one of z coordinates of point k with respect to camera o 21 obtained from active sensors, and $Z_{measured\ camera\ p\ point\ k}$ is z coordinates of point k with respect to camera p 23 obtained from active sensors An alternate embodiment to the exemplary implemented method for Step 221 can include use of other resultant algorithm (e.g. Macaulay Resultant) to directly solve the system of polynomials (e.g., FSSoEs) outputted by Step 219. In this example, for variables that represents depth of each matched pixel, use Buchberger algorithm to directly solve the system of polynomials (e.g., FSSoEs) outputted by Step 219. For variables that represents depth of each matched pixel, use Homotopy, Level-Set function, Expectation-Maximization or other optimization algorithms or other techniques.

An optional iterative step can be added to refine depth estimation may be used (e.g. gradient descent algorithm) at Step 247. In particular, refined depth estimates can be obtained using an exemplary SoEs that can be solved simultaneously with a gradient descent algorithm.

Note that Step 247 can be implemented to use a Metropolis-Hastings algorithm that samples a subset of polynomials in the multivariate system of polynomials outputted in Step 219 (e.g., FSSoEs) or univariate system of polynomials in Step 221 (e.g., SSSoE), and finding the solution to eliminate erroneous polynomials from the system of equations the multivariate system of polynomials outputted in Step 219 or univariate system of polynomials in Step 221, Random sample consensus (RANSAC) or other algorithms may be used to eliminate erroneous polynomials from the system of equations.

Note that Step 201 and subsequent steps can be implemented using other camera models (e.g. Plenoptic camera, fish eye camera, etc) beside a pin-hole camera, can be used providing that proper calibration and projective transformation are performed.

Referring to FIGS. 4 and 4.1, at Step 205, create inputs for Step 501 by performing steps from FIGS. 3, 3.1 and 3.2 Step 205 and generating Step 205 output from FIGS. 3, 3.1 and 3.2. At Step 501: reading and storing a first and second pixel sample windows (PSW) set data (e.g., twenty pixels x twenty pixels window) from sections of the images (taken with different camera settings) around pairs of respective PCs or MCs in respective pairs or sets of PSWs from cameras o 21 and p 23 associated with each MC or PC. Step 501 Output (1051): A plurality of first and second PSW set data for sampled images around MCs or PCs respectively from cameras o and p.

At Step 503: From each PSW set inputs associated with each MP or PC, calculate statistical variance of pixel values for each set of PSWs (e.g. color or grayscale intensities). Step 503 Output: (1053) Variance of pixel values data for each set of PSWs around each respective MP or PCs from camera o 21 PSWs and corresponding respective MP or PCs from camera p 23 PSWs.

At Step 505: From input first and second PSW sets and statistical variances, tag or identify/designate ones in each of the PSW sets as a sharper PSW and a blurrier PWS, wherein PSWs with lower variance are designated as a blurrier PSW and respective ones of the PSW sets with higher statistical variance are designated as a sharper PSW. Step 505 Output (1055): Sharper and blurrier identifiers respectively identifying each pair or sets of sharper and blurrier pixel sample windows around at least one MC or PC from camera o 21 PSWs that is sharper or less blurry than corresponding PSWs from camera p 23 plus the PSW data.

At Optional Step 507: Obtained optical transfer function for each camera settings from camera calibration input or blur radius. Step 507 output (1057): Point spread function (PSF) data which is then an optional input for Step 509

At Step 509: Create multiple blurred sharper PWS outputs by repeatedly blurring the sharper PSW inputs associated with sharper PSW identifiers using a 2D convolution of the sharper PSW data with an estimated, theoretical or measured optical transfer function (e.g., PSF or Gaussian probability distribution function) that incrementally blurs each PSW data designated with the sharper designator with different blur radius values (e.g. different standard deviations of Gaussian function). Step 509 Output (1059): a plurality of sets of blurred sharper PSWs for each PSW with the sharper designator as well as each PSW, the blurrier designator and each of the blur radius values used to produce the blurred sharper PSWs.

Generally, in Step 509, the sharper image can be convolved with a range of PSF filters that may match an amount of blur in a defocused image. An exemplary PSF filter set can be a list of 2D Gaussian transfer function(s) with different variance and total 2D integration value of one.

At Step 511, perform blind deconvolution on each set of blurred sharper PSWs and PSWs designated with blurrier identifier to output blind deconvolved or deblurred PSWs then determine blind PSF estimates for each of the blind deconvolved PSWs (e.g., using, e.g., MATLAB® deconvblind function). Total PSF of the filtered image can be estimated with a blind deconvolution technique. Blind deconvolution can be performed with several methods, such as the Lucy-Richardson algorithm, which utilize a Bayesian approximation. The PSF filter associated with the correct relative blur value can generate a PSF estimate that is similar PSF estimate from the defocused image. A relative amount of blur, and consequently the relative blur radius, can be determined by comparing the PSF of the images in Step 513. Step 511 Output: (1061) Blind estimates of PSFs data from blurred sharp PSWs and blurrier PSWs around respective MPs or CPs.

Generally, an exemplary implementation of Step 513 calculates a sum of magnitude of a difference between estimated PSF functions. In particular, at Step 513: Determining and outputting a set of measures of similarity associated with the blind PSF estimate from blurred sharper PSWs with the blind point spread function (PSF) estimate from the blurrier PSWs. An exemplary implementation can include computing a mean of absolute value of differences between corresponding elements of the blind PSF estimate (e.g., storing blind estimates of PSFs as matrixes then subtracting PSF matrix values from blurred sharp PSF matrix values then taking a mean of absolute value of the subtracted result). This exemplary similarity can be measured based on blind estimate of the point spread function instead of comparing blurrier PSW with the blurred sharper PSW, to mitigate point matching error. Step 513 Output: (1063) List of similarity measures of blurred sharp PSWs and PSWs with blurrier designators around MPs or PCs.

Generally, a Step 515 implementation of robust relative blur estimation algorithm estimates blur radius with best similarity measure input by interpolation of the set of the similarity measures, and outputs the associated blur radius, and estimate the relative blur as the square of the blur radius. This exemplary relative blur is used as input for depth from defocus algorithm starting at Step 213. In particular, at Step 515: Generate RBEs by computing and interpolating a graph of the measures of similarity values along y axis and blur radius values along x axis, and finding a minimum similarity measure which corresponds to a most similar blind PSF estimate and standard deviation of the Gaussian function that is used to blur a selected PSW with sharper identifier. The exemplary RBE can be a square of a standard deviation of Gaussian blur kernel that results in a most similar blind PSF estimate from a select blurred sharper PSW relative to the respective blind PSF estimate from selected PSW associated with blurrier designator. Output: (1011) RBEs.

Note, there is inventive significance in using the comparison of blind estimates of blur radius to obtain RBE that is robust against geometric transformation of images. Robustness against geometric transforms is necessary to perform DFD with two or more images that are taken from different camera positions. Alternative or optional steps may be also included with respect to FIGS. 4 and 4.1 processing or methods. For example, if two images are taken from a same image collection or imager perspective or field of view (or different fields of view or perspective as long as they are oriented on the same objects or structures or interest) such that pixel coordinates in both images correspond to same image features, or if a disparity between two pictures is very small, feature matching can be skipped, and sample windows from the same position in each images can be compared directly (e.g., using DFD). Multiple imagers capture timing may need to be synchronized to perform triangulation of moving objects. If relative positions or poses of imagers differs only by translational displacement parallel to the imager sensor plane, without relative rotation, depth ratios could be set to "1" and camera perspective is assumed to be identical for image pairs, respective x, y coordinates for each feature are assumed to be identical. Object tracking algorithm (e.g. optical tracking, Kalman filter, etc) may be used to compensate for objects' motions when object(s) does not undergo motion relative to each other. Algorithms that remove inconsistent data points may be used to remove moving objects that do not yield accurate PC from Step 205 (Output 1005) from the images (object recognition algorithm can be used to cut image segment that contain objects that may yield inaccurate PC from Step 205 (Output 1005). Motion blur may be used to measure or help determine an object's location by convolving estimates of a set of motion blur kernels with each image. Motion blur kernel may be estimated based on information from sensors e.g. Doppler radar, gyroscope and accelerometer) In addition, motion blur kernels may be represented as lines or curves that may be used for triangulation. DFD deconvolution can be performed with other algorithms, and a PSF can be estimated by division of the original and sharpened images in frequency domain. Instead of using a range of initial PSF estimates, a gradient descent algorithm can be used to find a best initial PSF estimate. Instead of subtracting blind PSF estimation, correlation between $PSF_{point\ m\ camera\ o\ 21}$ and $PSF_{point\ in\ camera\ p\ 23}$ can be maximized, and other cost functions can be used (e.g., least squares offset function). Gaussian PSF can be replaced by custom PSF, including PSF obtained from experiments.

Referring to FIGS. 5 and 5.1, exemplary processing is shown for performing monocular depth estimation using a selectively or periodically online trained neural network that is then used to generate real time depth estimation and a 3D model of structures or objects within images from cameras o 21 and p 23 FOVs (e.g., see FIG. 1). FIGS. 5 and 5.1 processing receives an input of unprocessed 2D Images or calibrated corrected 2D images and 3D model data from FIGS. 3, 3.1 and 3.2 and 4 processing which is an input to later steps. At Step 600, a determination is made to downsample the 2D inputs from FIGS. 3, 3.1 and 3.2; if yes, then the 2D images (1001 or 1003) are passed into optional Step 601; if no, then processing continues at Step 602.

Figure 6:
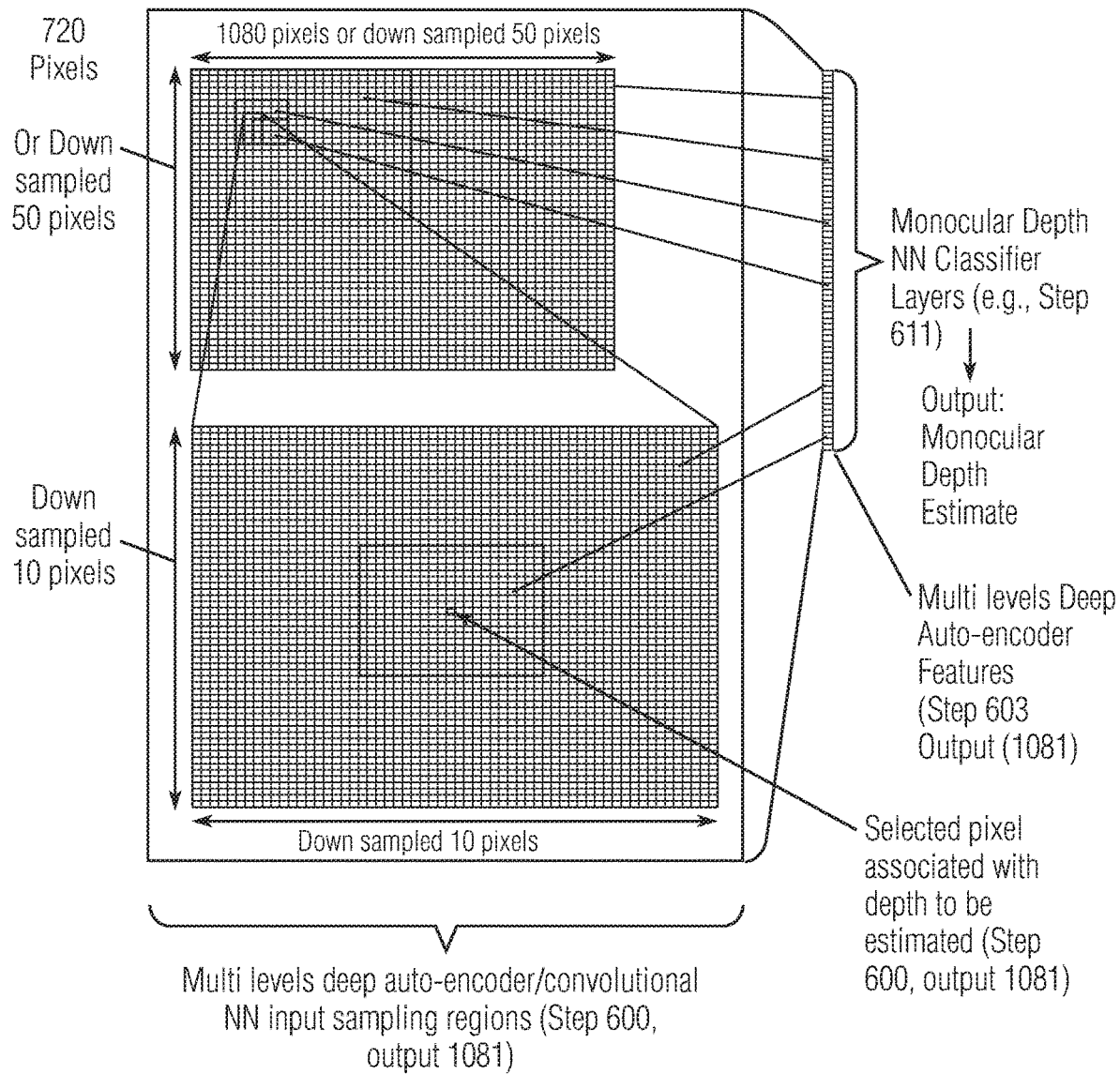
FIG. 6 shows an exemplary multi-resolution or density pixel selection and down sampling windows used with exemplary embodiments of the invention such as in FIGS. 1-5.

At optional Step 601: performing image down sampling on images output by cameras o and p (e.g., reducing pixel resolution by regions defined by proximity or pixel window sizes surrounding selected one or more selected pixels within images generated by the cameras o 21 and p 23) so there is more resolution close to a selected pixel in an entire image from a given camera o 21 or p 23 (e.g., see FIG. 1) for faster processing speed (e.g., see FIG. 6 showing down sampling by region relative to selected pixel coordinates). Optional Step 601 can be used to reduce the amount of time or computational resources (e.g. memory, processor time, etc) needed to train an auto-encoder or convolutional neural network. Down sampled set of images data is forwarded as patterned input data which may be passed into a trained auto-encoder/convolutional layer or might be passed into an auto-encoder trainer system. If an original 2D image is small enough, down sampling is unnecessary. Step 601 stores down sample output: (1083) down sampled table of pixel intensity along with pixel sampling windows' information such as size and location and either unprocessed 2D Images or calibrated corrected 2D images from Steps 201/203.

At Step 602: A determination is made to train an auto-encoder based on auto-encoder trigger parameters (e.g., due to X seconds, N images, difference between depth prediction based on an image formation model or active sensors (e.g., Step 245) vs NN depth predictor (e.g., Step 611) since last training). If Step 602 Auto-encoder/Convolutional NN training is triggered, then outputs from either Step 600 or 601 are passed to Step 605. If auto-encoder training is not triggered by a "no" determination at Step 602, then 601 Output or 602 Output is passed as an input to Step 603B.

At optional Step 598, additional 3D model data is obtained from computer generated images by performing geometric translation, blurring and alterations on unprocessed 2D Images or calibrated corrected 2D images and 3D model data from FIGS. 3, 3.1, 3.2, 4 and 4.1 processing (Output 1045) and camera settings and system states (Output 1002). Training data can also be obtained from external sources (e.g. other vehicles, and 3d datasets (http://www.cylibs.net/datasets/kitti/)) and computer generated images or scenarios (e.g. CARLA: An Open Urban Driving Simulator). Step 598 generates output (1104) comprising): 1045 data plus 1002 data plus table of pixel intensity for the 2D images or calibrated corrected 2D images along with pixel sample windows' information such as size and location obtained from measurements or computer simulation and system settings . Output 1104 is passed to Step 605, 603A and 609. Optional Step 598 determines if additional machine learning training data is needed. Select camera settings and system states to simulate and generate additional training data or computer generated images with computer simulation. An exemplary Optional Step 598 processing perform simulation of forward translation motion of camera o 21 or camera p 23, images generated by translated cameras using "imresize" MATLAB function after forward translation motion of cameras 'o'21 and 'p' 23, and simulation of estimated depth after forward translation motion of cameras o' 21 and camera p 23 (e.g., see FIG. 1). (e.g., see https://www.google.com/url?sa=t&rct=j&q=&esrc=s&source=web&cd=2&cad=rja&uact=8&ved=0ahUKEwiw5NaE17 zY-AhXGKCYKHas0D68OFgg0MAE&url=https%3A%2F%2Farxiv.org%2F pdf%2F1711.03938&usg=AOvVaw2OK-Pnz-Yvo- PYR4Aua7XEchr)) This exemplary process estimates 2D images and 3D data from situations (e.g. motion blur produced by a moving camera using MATLAB imfilter function), environments (e.g. snow, fog, rain, virtual crowd overlaid on images of empty streets) or camera pose (e.g.

viewing of a 3D object from different distances and angles, view from future camera o 21 and camera p 23 position such as when the camera o 21 and camera p 23 (e.g., see FIG. 1) moves forward along with a vehicles it is attached to) that have not been acquired by the camera or other active sensor system (e.g. radar, sonar) (e.g., simulate movement of the camera to a predicted future location with a different x, y, and z coordinate, then run a program that generates a new view of camera in new location using MATLAB function "IMRESIZE" (zoom in, zoom out which is a move forward or backwards) (e.g. see https://www.mathworks.com/help/images/geometric-transformations.html, https://www.mathworks.com/help/images/spatial-referencing.html?searchHighlight=imwarp&s_tid=doc_srchtitle; Multi View Geometry Book by Harley & Zisserman; Depth from Defocus Book by Favaro & Soatto, https://www.mathworks.com/help/images/ref/imfilter.html).

At Step 605, processing commences to train a multi-scale/multi-level Auto-Encoder/Convolutional NN with patterned input data trained to extract monocular depth cues from each of the input 2D images (1001 or 1003 or 1104). Output from Step 605 (1085): Trained Auto-encoder/Convolutional NN. As described in more detail in FIG. 6, exemplary auto-encoder input pattern is set such that an image region near a selected pixel associated with depth to be estimated/or pixel to be grouped in a segmented and classified image is sampled more densely than the region farther away from the selected pixel. Different from some traditional convolutional neural network algorithm that tends to filter out features from an earlier convolutional layer, in this exemplary implementation, features from multiple convolutional or auto-encoder layers are used as inputs for the depth estimation/classification layer to allows the depth estimation layers to use large scale image features as well as small scale features. This exemplary NN setup allows for depth classification in situations where local image or features around a pixel or data do not have distinguishable features (e.g. an object with a sub region that has monochrome color without texture) that can be used find to MP or CP correspondences in different images in Step 205.

Next, Step 603A is performed with Step 605 output (1085) which then outputs 1084A data including vector of numbers (e.g., an array) for each selected pixel that describes one of the features in a compressed length or storage size compared to the input of Step 603A (e.g., image features).

At Step 609, a depth estimator is trained based on Step 603A inputs (1084A) and Step 245 output of 2D images (1001 or 1003) and camera settings and system settings (1002) and Step 598 output (1104). In particular, at Step 609 depth estimation of points in the 2D images is obtained from Step 245 or Step 598, and these depth estimations are used to train a NN classifier layer(s) for a discrete set of depths or regression layer(s) for continuous range of depth estimation (e.g., fully connected NN layer(s)) that outputs monocular depth estimates. Images and other types of data such as camera settings, system settings and system states (camera settings (e.g. focal length, exposure that is part of 1002 and 1001), setup (e.g. stereo baseline, field of view orientation) and vehicle state (e.g. velocity) and active range finder data (e.g. radar, sonar) and other sensor states (e.g. gyroscope and accelerometers) may be used as optional inputs to NN. Other type of NNs (e.g., Learning Vector Quantization, Self Organizing Map, Long-Short Term Memory) may be used.

At Step 603B, the trained auto-encoder or other type of NN (e.g. convolutional NN) 1085 is input and used to extract monocular image features in the subsequent frames. In particular, at Step 603B: Using trained auto-encoder (or convolutional layer) to perform feature extraction searching for specified image features in the 2D images input. Step 603B Output: (1084B) Vector of numbers (e.g., an array) for each selected pixel that describes one of the features in a compressed length or storage size compared to the input of Step 603B (e.g., image features).

At Step 611, a NN depth predictor is executed using the trained depth estimator NN 1086 (generated at Step 609) and Step 603B output (1084B) and Step 201 output (1002). Step 611 Output (1089): Category 2 Real Time Depth Estimation and 3D model of structures within camera(s) FOVs. The multi-scale auto-encoder (1084B) features are used to predict depth from a single monocular 2D image.

A live NN training allows may provide dense depth estimations in real time even when SFM, DFD, depth from focus, or active range sensing requires longer processing time due to computational resources constrains or experiences a degenerate condition. An exemplary implementation of a real time depth estimation can be implemented by using monocular depth estimation with NN based on sample image features and associated estimated depths that are obtained by slower methods in previous time. Depth estimation from active depth sensor may be assigned greater weight than depth estimation from passive sensors in the neural network training steps in FIGS. 5 and 5.1 to reduce errors or perform data smoothing in situations when passive depth sensing generates erroneous estimation (e.g. depth estimation where reflective surfaces exist in the environment). Machine learning depth estimation may smooth errors that may result from symbolic calculations, depth estimation based on geometric modeling or inaccurate measurements. The number of neural network nodes may be increased to increase resolution of estimated 3D model, or decreased to improve speed of NN computation and training. Multiple images from multiple cameras or from a set of images taken at different times may be used as inputs to depth estimation machine learning or neural network algorithm. The exemplary machine learning depth estimation can be used to produce dense depth map from two dimensional images by inferring, interpolating or extrapolating depth of pixels from parts of images with unknown depth and based on data or image of an object of known depth that are calculated from other methods (e.g. SFM, DFD, LIDAR, etc). The exemplary Step 611 is implemented using MATLAB functions (e.g. using, e.g., MATLAB ® fitnet function and MATLAB ® train function) Optionally, real time training of the NN can be performed using a Real Time Recurrent Learning method. Other forms of neural networks such as Long short-term memory (LSTM), and one-shot learning methods can be used to speed up learning process with fewer samples. (https://en.wikipedia.org/wiki/Long_short-term_memory). Active learning methods can be used to determine the optimal number and combination of simulated training data, camera images data, passive multi views triangulation data, stereo triangulation data, monocular triangulation data, and active triangulation data.

Figure 8A:
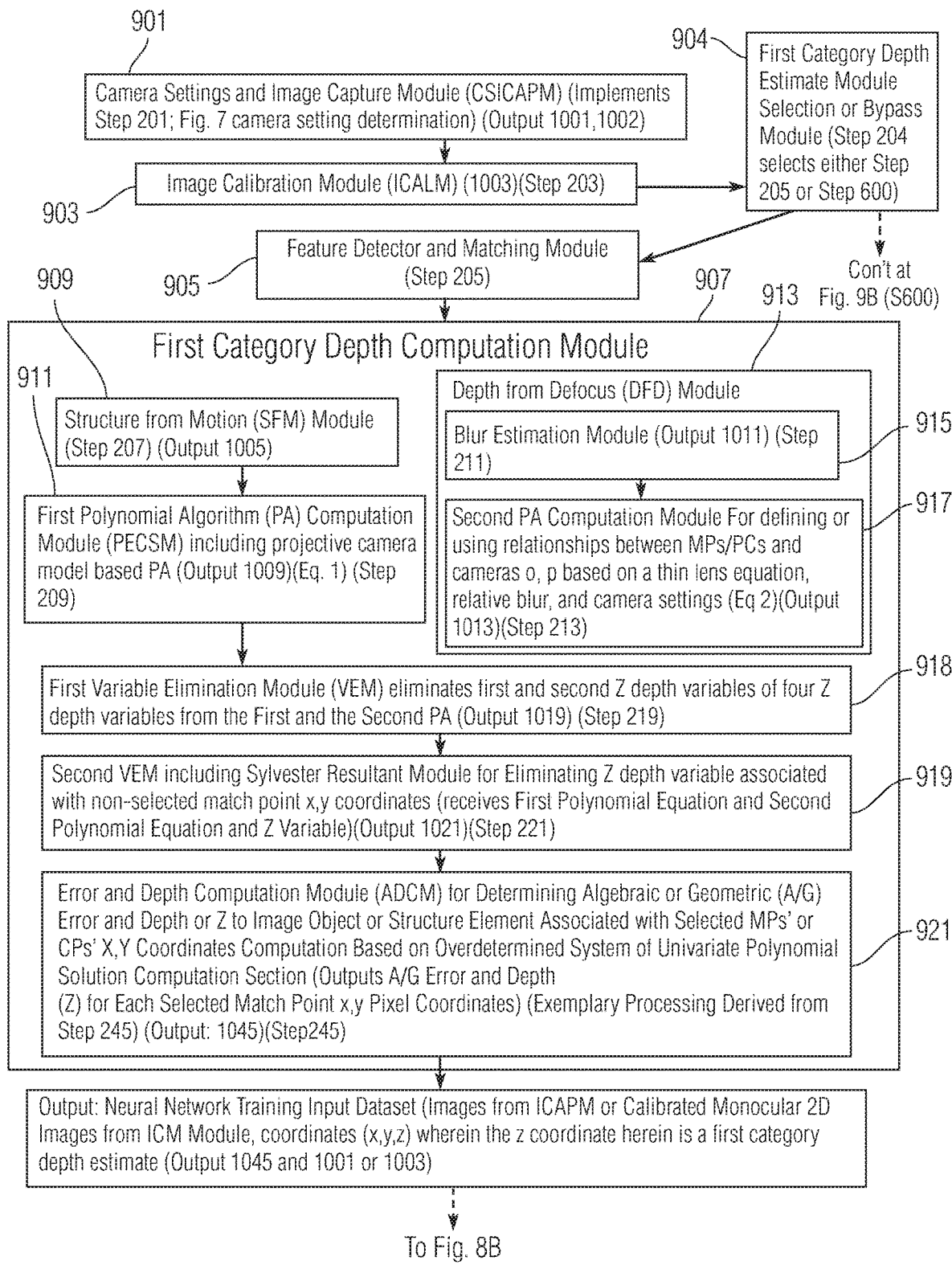
FIGS. 8A and 8B shows an exemplary software architecture for one embodiment of the invention executing processing or machine instructions performing steps or functions such as shown with respect to FIGS. 3-7.
Figure 8B:
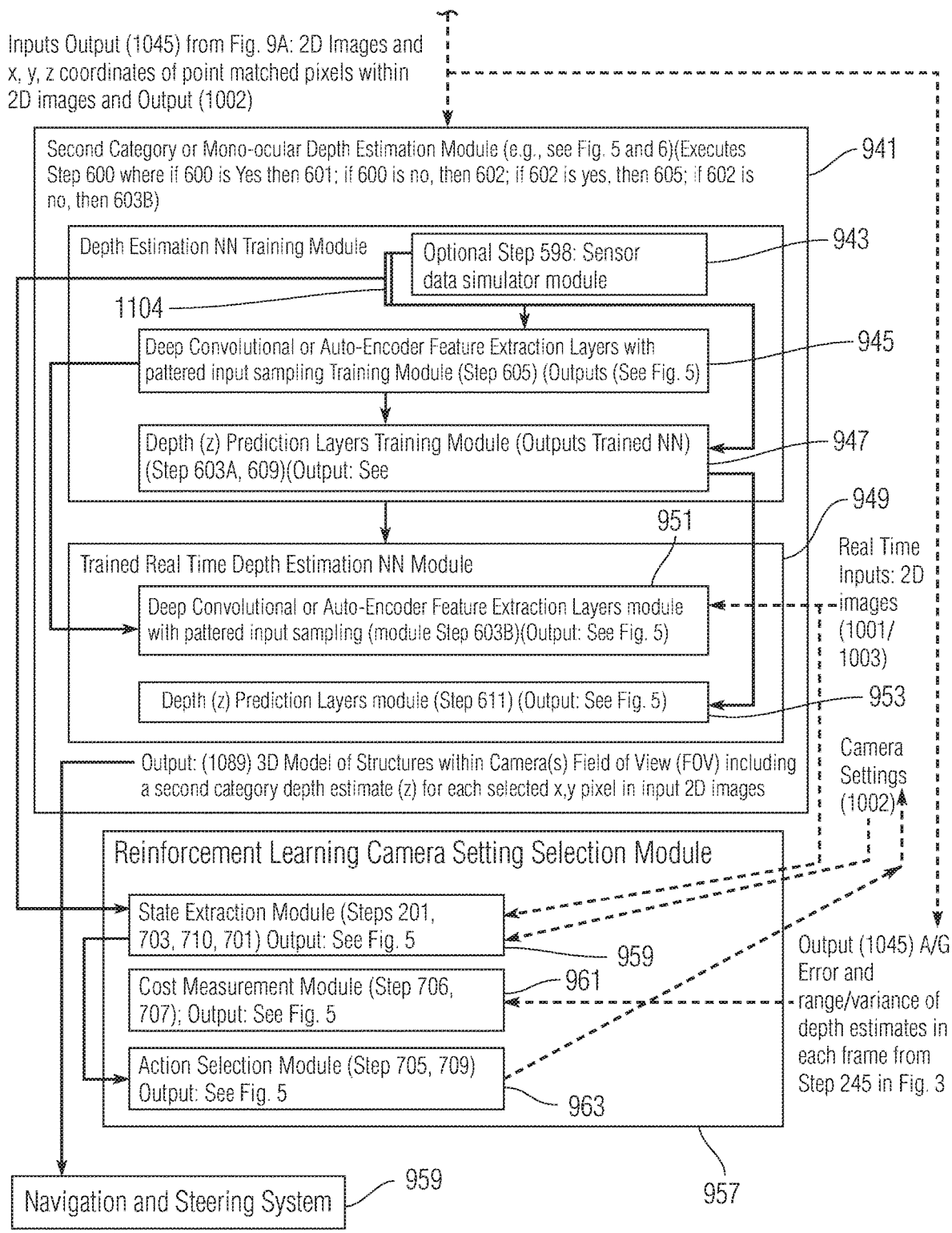

Referring to FIG. 6, an illustration of aspects of a down-sampling decision step (e.g., Step 600/601 and FIG. 8B Deep Convolutional or Auto-Encoder Feature Extractor 951) output (FIGS. 5 and 5.1, 1083) which is passed into an exemplary Deep Convolutional or Auto-Encoder Feature Extraction Layers with pattered input sampling (e.g., FIG. 8B, 951), and Depth (z) Prediction Layers (e.g., FIG. 8B, 953) to perform monocular depth estimation using output from online NN training in Depth Estimation NN Training Module (e.g., FIG. 8B, 943). Note that the down-sampling of images is patterned such that the area around a selected pixel coordinate associated with depth to be estimated is more densely sampled compared to the area far away from the selected pixel. The patterned sampling allows the Auto-Encoder / Convolutional NN (e.g., FIG. 8B, 951) to extract small sized and large sized image features while still limiting the amount of computer resources (CPU, GPU, Data Storage Units, RAM memory, power) used to train and execute a NN to perform monocular depth estimation, as well as reducing the number of training samples necessary to train the NN. Sampling ratio (e.g., number of pixel in sampled input divided by number of pixels in original PSW) at a PSW area near the selected pixel is low16ber than in the PSW area farther away from the selected pixel. Smaller or detailed image feature extraction is prioritized in the PSW area near the selected pixel, and the larger sized features are prioritized at the PSW area farther away. Exemplary implementation down sampled each PSW shown in FIG. 6 with different grayscale colors (each PSW includes an area covered by smaller PSWs) to an image of fifty pixels by fifty pixels. The auto-encoder /Convolutional NN for each PSW areas with different sizes are trained separately to enable the NN to recognize and extract unique image features in each PSW area. Sampling may also be patterned according to a deterministic mathematical function or sampling probability distribution (e.g. each PSW area can be divided into 250 smaller sub-blocks and randomly sampling or averaging pixel intensities in each block).

Figure 7:
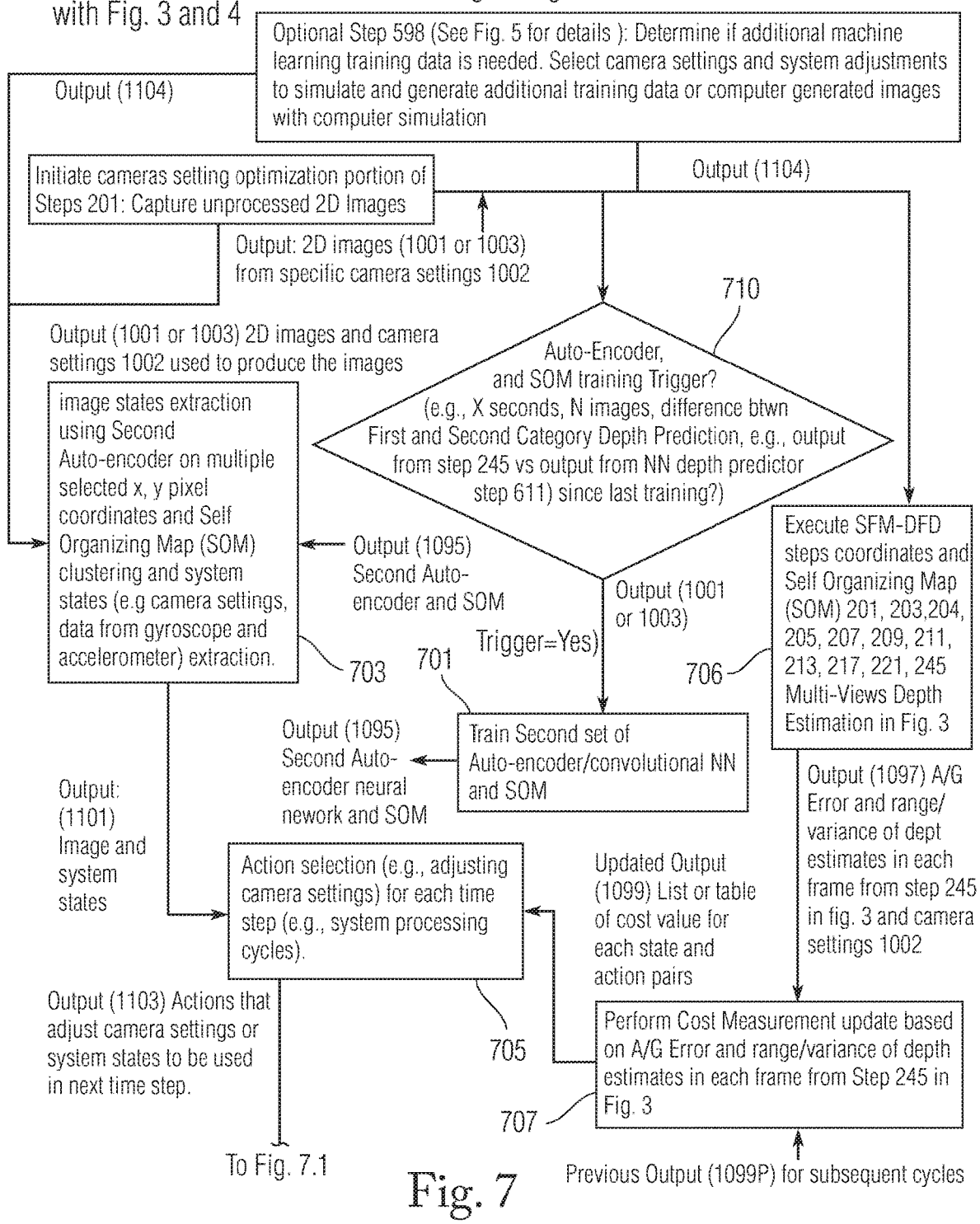
FIG. 7 shows an exemplary embodiment including a machine learning system used to determine optimal camera settings for 3D scene reconstruction used for camera setting configuration/determination associated with exemplary embodiments such as in FIGS. 1-7.

FIGS. 7 and 7.1 show an exemplary embodiment including a machine learning system used to determine optimal camera settings for 3D scene reconstruction used for camera setting configuration / determination associated with exemplary embodiments such as in FIGS. 1-7.1. In particular, exemplary processing is shown for an application of machine learning to determine optimal camera setting for 3D scene reconstruction used for camera setting configuration / determination associated with FIGS. 3, 3.1, 3.2, 4 and 4.1. An exemplary embodiment can include a function call associated with Step 201 to initiate cameras setting optimization or determination portions of Steps 201 / FIGS. 7 and 7.1 steps by capturing unprocessed 2D images, then output: 2D images (1001) or by producing calibrated corrected 2D images (1003) from specific camera settings or by producing computer generated images based on simulated specific camera setting (1104) selected by reinforcement learning algorithm and output (1101) 2D images and camera settings or system states used to produce the images. At Step 710: A determination is made to train an auto-encoder and self-organizing map (SOM) based on auto-encoder and SOM trigger parameters (e.g., due to X seconds, N images, difference between First and Second Category Depth Prediction (e.g., output from Step 245 or output from Optional Step 598 vs output from NN depth predictor Step 611) since last training. If Step 701 second auto-encoder/ Convolutional NN training is triggered, then output (1095) from second auto-encoder/ Convolutional NN and SOM is passed to Step 703 when Step 703 is processed again. Concurrently, at Step 706, using output (1001), execute SFM-DFD Steps 201, 203, 204, 205, 207, 209, 211, 213, 217, 221, 245 Multi-Views Depth Estimation in FIGS. 3, 3,1 and 3.2, and output (1097) A/G Error and range/variance of depth estimates from Step 245 for each image 1001 or 1003 or 1104 frame in FIGS. 3, 3.1 and 3.2. Receiving output (1097), at Step 707: Perform Cost Measurement update based on A/G error and range/variance of depth estimates in each frame from Step 245 in FIGS. 3, 3.1 and 3.2 and output (1099) list or table of cost value. Step 707 produces an updated output (1099) list or table of cost value for each state and action pairs which is used in Step 705: Action selection for each time step, where each action corresponds to changes in camera settings. Output (1099) lists how much error is caused by an action taken at a specific state, and the range or variation of depths. For each iteration or time step, calculate and update cost table (1099) by arbitrarily exploring possible action or by choosing optimal action (e.g. using greedy algorithm and the cost value lookup table). Using output (1001 or 1003 or 1104) and output (1095, Second Auto-Encoder / Convolutional NN and SOM), execute Step 703: performing image states extraction using Second Auto-Encoder/ Convolutional NN on multiple selected x, y pixel coordinates and Self-Organizing Map (SOM) clustering and system state (e.g., camera settings 1002 or camera settings data from a camera hardware configuration query) extraction. Note that exemplary 603A or 603B Outputs (1084A or 1084B) in FIGS. 5 and 5.1 are obtained from Auto-Encoder / Convolutional NN features extracted from a single x, y pixel coordinate, whereas Step 703 extracts features from multiple selected x, y pixel coordinates. Step 703 produces output: (1101) image and system states. 2D images (1001 or 1003 or 1104) are taken with specific camera setting. In Step 703 monocular image features are obtained with trained Auto-Encoder from Step 701. Monocular image features are determined using output (1095) is grouped with SOM NN. Output of SOM NN and other system states (camera settings (e.g. focal length, exposure that is part of 1001), setup (e.g. stereo baseline, field of view orientation) and vehicle state (e.g. velocity) and other system states (e.g. gyroscope and accelerometers) are set as state description of the exemplary imaging system as Auto-Encoder image features in Output (1101). Note that SOM transforms encoded features into smaller set of discrete states and allows for incremental update of the relation between state and encoded features produced by second Auto-Encoder/Convolutional NN. Each discrete SOM output is associated to a system state in reinforcement learning. SOM outputs are used to represent the state of the external environment. SOM allows for the possibility of real-time or incremental update of the relation between state and encoded features. Other states, such as camera FOV orientation, etc, may be used in specifying system state settings. NNs may also be used to classify objects, provided that correct training sets are provided. Using output (1011), Step 705: execute action (e.g., exemplary actions are defined as adjustments to camera settings 1002 or system states such as increasing camera zoom) selection for each time step determines output (1103): actions that adjust camera settings or system states to be used in next time step (e.g., system processing cycles). Note that for systems with multiple cameras, each camera may be associated with different sets of actions. Using a machine learning algorithm (e.g., State-Action-Cost-State-Action or modified variant of State-Action-Reward-State-Action (SARSA)) to determine optimal camera settings, an exemplary state is evaluated, and action is taken at a predetermined time schedule. At Step 705, reinforcement learning is used to search for optimal camera settings (e.g. increase zoom, change focus, image capture synchronization with multiple camera, etc) to obtain an increased accuracy depth estimation by minimizing a cost function (e.g. average errors of the system of equations from Step 245) for the current external environment, weather or road conditions. The exemplary machine learning algorithm first sets an arbitrary initial system state, cost value table for possible states (e.g. cost value can be defined as an average error of the system of equations from Step 245, or other algebraic and geometric errors obtained in 3D reconstruction processes) and chosen actions (e.g., change in camera setting (e.g. increase zoom, change focus, etc), vehicle steering, etc), or load this values from hard disk based on prior knowledge or experiments.

Using Output (1103), Step 709: Apply camera settings or system adjustment used to obtain 2D images from optimal/selected camera setting, training images for auto-encoder neural network at each state that is explored and training images for depth estimator neural network at each state that is explored and to execute optional step 598. Camera settings or system adjustment output (1002) from Step 709 is used to execute Step 201 and continue processing at Step 203 in FIGS. 3, 3.1 and 3.2 and Step 600 in FIGS. 5 and 5.1. Output (1002) can be used to execute Optional Step 598

In various embodiments, reinforcement learning can be used to search for optimal camera settings to obtain the most accurate depth estimation for current external environment, weather or road conditions. This exemplary machine learning process, as shown in FIG. 7, can be performed with a set of cameras, while using another set of cameras to perform depth estimation using camera settings that are optimized in a previous time step. By changing camera settings to obtain 3D reconstruction, the camera or vehicle can stop when it encounter an unfamiliar scene, and adjust the camera settings to obtain a more accurate 3D reconstruction (e.g. increasing the camera exposure/integration time in a low light environment) prior to moving the vehicle and imagers in the camera, whereas a traditional SFM requires vehicle movement to obtain larger camera displacement to improve accuracy. Note that a simple reinforcement learning algorithm is used in the pseudo code example, but other machine learning methods such as recurrent neural network can be used. Reinforcement learning algorithm is used to attempt to find optimal action or change in camera setting based on the current state or image features. This exemplary implementation allows the autonomous vehicle to optimize and refine accuracy of a map the depth of its surrounding by adjusting camera settings without prior to performing vehicle movement. In addition, by changing camera field of views orientation and zoom, camera can be aimed to map three dimensional structures along the direction of vehicle movement and around areas that can produce accurate depth estimation across a wide range of depth and around objects selected by object recognition methods. Actions selection, state extraction and costs measurements may include states, actions and cost measurements from multiple cycles. An exemplary application is to set camera direction or field of view that avoids areas with low amount of texture or high amount of glare, or avoids camera settings that contribute to abnormally high measurement noise. Neural network or other machine learning methods may be trained to predict values of cost measurement Output (1099) from input states, and these methods may be used to substitute Step 707. Multiple images from multiple cameras or from a set of images taken at different times may be used as inputs to camera stetting selection machine learning or reinforcement learning algorithm.

Note that the exemplary FIGS. 7 and 7.1 reinforcement learning process is iterated until an optimal cost value is obtained for each possible output (e.g., x number of clustering and system states determined in Step 703): (1101) image and system states, and stored in a recording medium, e.g. hard drive, as output (1099). Then, based on Output (1099) and Output (1097), update the previous output cost value table (1099P) to be used in the next step or iteration to create or store output (1099P vs 1099). Exemplary Step 705 is implemented by selecting, according to a predetermined probability chance, an action based on either a random selection from possible actions or a greedy algorithm to select action associated with lowest cost in Output (1099) (e.g. see SARSA concepts). Reinforcement learning cycles are repeated until the cost values (1099 vs 1099P) changes less than a predetermined threshold or until a predetermined number of iterations is performed. This exemplary reinforcement learning process or algorithm outputs an optimal camera setting or the state of the hardware (e.g., 1002), 2D images from optimal camera settings, training images for auto-encoder neural network at each state that is explored and training images for depth estimator neural network at each state that is explored.

FIGS. 8A and 8B shows exemplary software architecture for one embodiment of the invention executing processing or machine instructions performing steps or functions such as shown with respect to FIGS. 3-7. In particular, FIGS. 8A and 8B shows a variety of software modules which implement various processing steps.

Referring to FIG. 8A, exemplary machine readable instructions or modules include a Camera Settings and Image Capture Module (CSICAPM) 901 that implements Step 201 and FIGS. 7 and 7.1 camera setting determinations and produces output 1001. An Image Calibration Module (ICALM) module 903 is also provided which implements Step 203 and produces output 1003. A First Category Depth Estimate Module Selection or Bypass Module 904 is also provided which implements Step 204 and either calls either Step 205 or Step 600. Feature Detector and Matching Module is also provided which implements Step 205. A First Category Depth Computation Module 907 is provided which includes a variety of modules including 909, 911, 913, 918, 919, and 921, and outputs Neural Network Training Input Dataset (Images from ICAPM or Calibrated Monocular 2D Images from ICM Module, coordinates (x,y,z) (Output 1045 and 1001 or 1003)). A Structure from Motion (SFM) Module 909 is also provided that implements Step 207 and produces output 1005. A First Polynomial Algorithm (PA) Computation Module (PECSM) is also provided that 911 implements Step 209 and is defined based on a projective camera model based PA that produces output 1009 (911). A Depth from Defocus (DFD) Module 913 is provided that includes a Blur Estimation Module 915 (that implements Step 211 (Output 1011)) and a Second PA Computation Module 917 (for defining or using relationships between MPs/PCs and cameras o 21, p 23 (e.g., see FIG. 1) based on a thin lens equation, relative blur, and camera settings (Output 1013)) that implements Step 213. A First Variable Elimination Module (VEM) 918 is provided that eliminates first and second Z depth variables of four Z depth variables from the First and the Second PA and that implements Step 219 and produces Output 1019. A Second VEM including Sylvester Resultant Module 919 is provided for eliminating a Z depth variable associated with non-selected match point x, y coordinates (receives First Polynomial Equation and Second Polynomial Equation and Z Variable) that implements Step 221 and produces output 1021. An Error and Depth Computation Module (EDCM) 921 is provided for determining algebraic or geometric (A/G) error and depth or Z to image object or structure element associated with selected match point x, y coordinates computation based on overdetermined system(s) of univariate polynomial solution computation section (Outputs A/G error and depth (z) for each selected match point x, y pixel coordinates that implements Step 245 and produces output 1045.

Referring to FIG. 8B, a Second Category Depth Computation Module 941 is provided which includes a variety of modules including modules 943 and 949, and outputs a 3D model of image structures within camera(s) field of view (FOV) including a depth estimate (z) for each selected x, y pixel in input 2D images (Output 1089). A Depth Estimation NN Training Module 943 is provided that includes modules 945 and 947. A Deep Convolutional or Auto-Encoder Feature Extraction Layers with pattered input sampling training module 945 that implements Step 605. A Depth (z) Prediction Layers Training Module 947 that implements Step 603A and 609 is also provided. A Trained Real Time Depth Estimation NN Module 949 is provided that includes modules 951 and 953. A Deep Convolutional or Auto-Encoder Feature Extraction Layers with Patterned Input Sampling Module 951 that implements Step 603B is also provided. A Depth (z) Prediction Layers Module 953 is also provided that implements Step 611. Another software package includes a Reinforcement Learning Camera Setting Selection Module 957 that includes modules 959, 961 and 963. A State Extraction Module 959 is provided that implements Steps 201, 598 703, 710 and 701. A cost measurement module 961 is provided that implements Step 706, 707. An Action Selection Module 963 is provided that implements Step 705 and 709.

Figure 9:
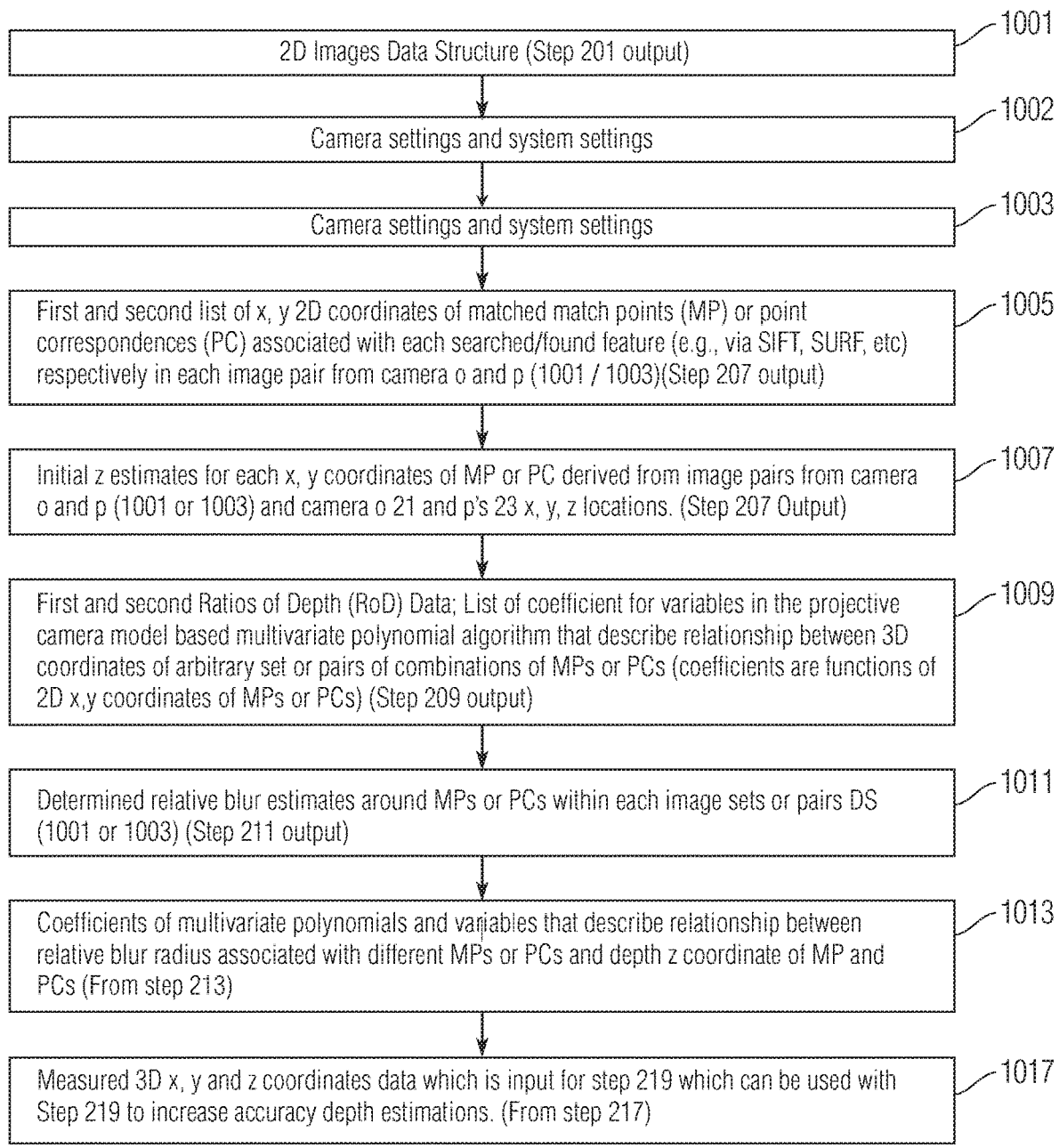
FIGS. 9, 10, 11, and 12 show exemplary data structures used with embodiments of the invention.

FIGS. 9, 10, 11, and 12 show exemplary data structures used with embodiments of the invention. FIG. 9 shows DS (1001) 2D Images Data Structure (Step 201 output); DS (1002) stores camera settings; DS (1003) calibrated/corrected 2D Images Data Structures (Step 203 output); DS (1005) First and second list of x, y 2D coordinates of matched match points (MP) or point correspondences (PC) associated with each searched/found feature (e.g., via SIFT, SURF, etc) respectively in each image pair from camera o 21 and p 23 (DS 1001/1003)(Step 205 output); DS (1007) Initial z estimates for each x, y coordinates of MP or PC derived from image pairs from camera o 21 and p 23 (e.g., see FIG. 1) (DS 1001 or 1003) and camera o 21 and p 23's 23 x, y, z locations. (Step 207 Output); DS (1009) stores first and second Ratios of Depth (RoD)

Data; List of coefficient for variables in the projective camera model based multivariate polynomial algorithm that describe relationship between 3D coordinates of arbitrary set or pairs of combinations of MPs or PCs (coefficients are functions of 2D x, y coordinates of MPs or PCs) (Step 209 output). DS (1011) Determined relative blur estimates around MPs or PCs within each image sets or pairs DS (DS 1001 or 1003) (Step 211 output); DS (1013) Coefficients of multivariate polynomials and variables that describe relationship between relative blur radius associated with different MPs or PCs and depth z coordinate of MP or PCs (From Step 213); DS (1017) Measured 3D x, y and z coordinates data which is input for Step 219 which can be used with Step 219 to increase accuracy depth estimations that implements Step 217).

Figure 10:
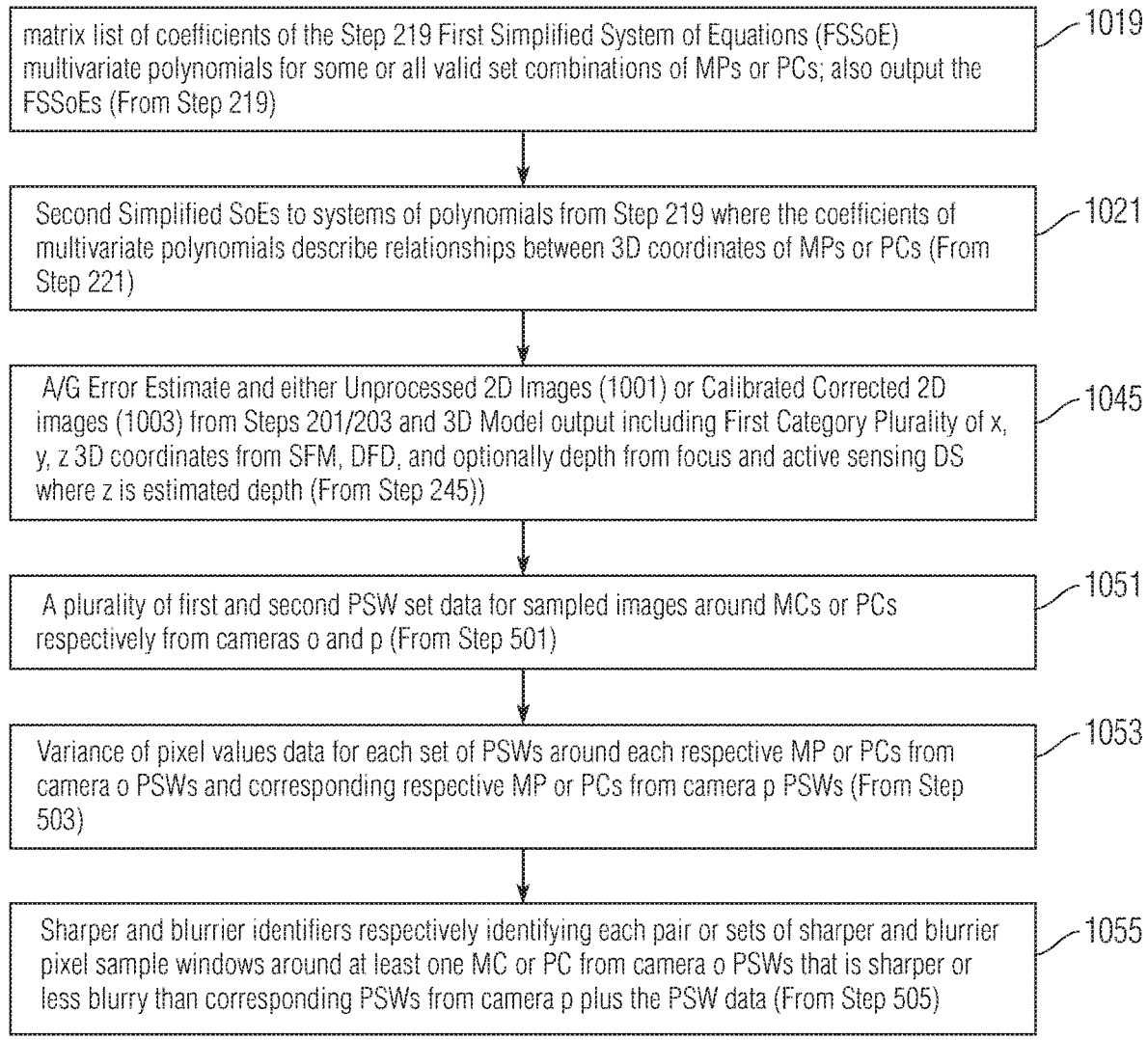

FIG. 10 shows: DS (1019): matrix list of coefficients of the Step 219 FSSoE multivariate polynomials for some or all valid set combinations of MPs or PCs well as the FSSoEs (From Step 219); DS (1021) Second Simplified SoEs to systems of polynomials from Step 219 where the coefficients of multivariate polynomials describe relationships between 3D coordinates of MPs or PCs DS (From Step 221); DS (1045) A/G Error Estimate and either Unprocessed 2D Images (1001) or Calibrated Corrected 2D images (1003) from Steps 201/203 and 3D Model output including First Category Plurality of x, y, z 3D coordinates from SFM, DFD, and optionally depth from focus and active sensing DS where z is estimated depth (From Step 245); DS (1051) A plurality of first and second PSW set data for sampled images around MCs or PCs respectively from cameras o 21 and p 23 (e.g., see FIG. 1) (From Step 501); DS (1053) Variance of pixel values data for each set of PSWs around each respective MP or PCs from camera o 21 PSWs and corresponding respective MP or PCs from camera p 23 PSWs (From Step 503); DS (1055) Sharper and blurrier identifiers respectively identifying each pair or sets of sharper and blurrier pixel sample windows around at least one MC or PC from camera o 21 PSWs that is sharper or less blurry than corresponding PSWs from camera p 23 plus the PSW data (From Step 505).

Figure 11:
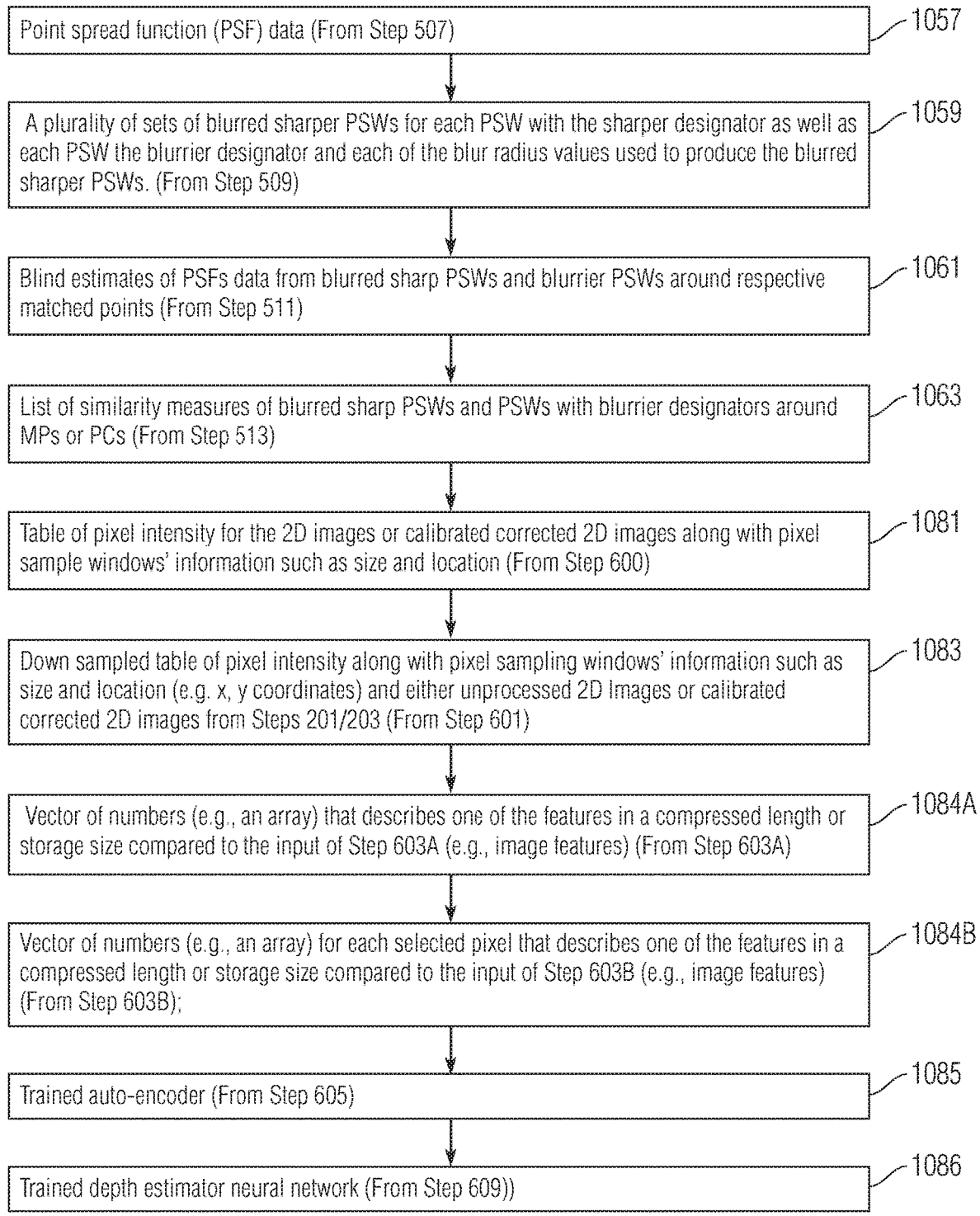
Figure 12:
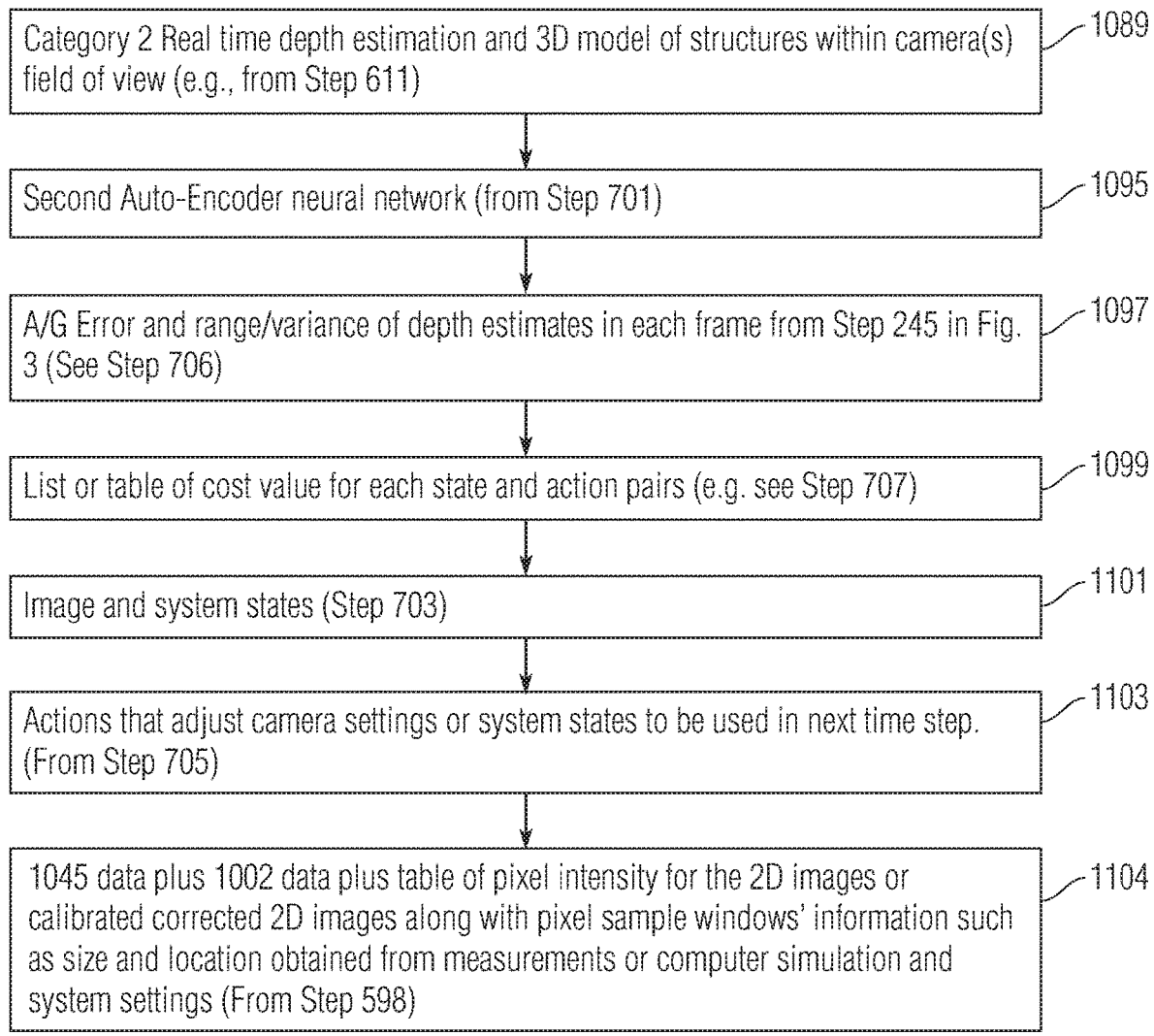

FIG. 11 shows exemplary data structures: (1057) Point spread function (PSF) data (From Step 507); (1059) A plurality of sets of blurred sharper PSWs for each PSW with the sharper designator as well as each PSW the blurrier designator and each of the blur radius values used to produce the blurred sharper PSWs. (From Step 509); (1061) Blind estimates of PSFs data from blurred sharp PSWs and blurrier PSWs around respective matched points (From Step 511); DS (1063) stores a list of similarity measures of blurred sharp PSWs and PSWs with blurrier designators around MPs or PCs (From Step 513); DS (1081) stores table of pixel intensity for the 2D images or calibrated corrected 2D images along with pixel sample windows' information such as size and location (From Step 600); DS (1083) stores down sampled table of pixel intensity along with pixel sampling windows' information such as size and location (e.g. x, y coordinates) and either unprocessed 2D Images or calibrated corrected 2D images from Steps 201/203 (From Step 601); DS (1084A) stores vectors of numbers (e.g., an array) that describes one of the features in a compressed length or storage size compared to the input of Step 603A (e.g., image features)(From Step 603A); (1084B) stores vectors of numbers (e.g., an array) for each selected pixel that describes one of the features in a compressed length or storage size compared to the input of Step 603B (e.g., image features) (From Step 603B); DS (1085) stores Trained Auto-Encoder data (from Step 605); DS (1086) stores trained depth estimator neural network data (From Step 609);

FIG. 12 shows: DS (1089) stores category 2 real time depth estimation and 3D model of structures within camera(s) field of view; DS (1095) stores second Auto-Encoder/convolutional neural network; DS (1097) stores A/G error and range/variance of depth estimates in each frame from Step 245 in FIGS. 3, 3.1 and 3.2; DS (1099) stores a list or table of cost value for each state and action pairs; DS (1101) stores image and system states; and DS (1103) stores data that is used to execute actions that are used to adjust camera settings or system states based on changes to settings and system states previously stored in DS (1002) to be used in a next time step. DS (1104):1045 data plus 1002 data plus table of pixel intensity for the 2D images or calibrated corrected 2D images along with pixel sample windows' information such as size and location obtained from measurements or computer simulation and system settings (e.g., simulation can include creating a zoomed or a closer view 2D image of an object in an actual 2D image) (From Step 598).

Various exemplary embodiments allow an autonomous vehicle to map the depth of its surrounding without prior to performing vehicle movement. For each camera setting explored by this algorithm, steps in FIG. 1-FIG. 9 are performed. This step outputs the optimal camera setting or the state of the hardware, 2D images from optimal camera setting, training images for auto-encoder neural network at each state that is explored and training images for depth estimator neural network at each state that is explored. Learning process can be performed with a set of cameras, while using another set of cameras to perform depth estimation using camera settings that are optimized in a previous time step. By changing camera settings to obtain 3D reconstruction, the camera or vehicle can stop when it encounter an unfamiliar scene, and adjust the camera settings to allow for more accurate 3D reconstruction e.g. increasing the camera exposure/integration time in a low light environment. Camera calibration may also be updated overtime using reinforcement learning approach.

Although the invention has been described in detail with reference to certain preferred embodiments, variations and modifications exist within the spirit and scope of the invention as described and defined in the following claims.

The invention claimed is:

1. An autonomous system including a machine vision system comprising:
   a processor that reads and executes machine instructions, at least two cameras with overlapping fields of views (FOV), a machine instruction and data storage medium, and a plurality of machine instructions stored on the machine instruction and data storage medium, wherein the plurality of machine instructions comprises:
   a Camera Settings and Image Capture Module (CSICAPM) that operates a first plurality of machine instructions that operate the at least two cameras and processor to capture pairs of images from the at least two cameras with known camera settings;
   an Image Calibration Module (ICALM) that receives the pairs of images and generates calibrated two-dimensional (2D) images using geometric camera calibration processing for correcting for lens distortion and relating camera sensor dimensions within each image into three-dimensional (3D) dimensions of 2D objects within each of the pairs of images;
   a Feature Detector and Matching Module that detects predefined pixel patterns associated with same structures in respective said pairs of images then outputs match points (MPs) associated with a detected feature with the predefined pixel patterns;
   a plurality of machine instructions that operate first and second category depth estimation (DE) modules (DEM) that generates a plurality of first and second depth estimates for each MP;
   wherein the first category DEM includes:
      a Structure from Motion (SFM) Module to generate an initial first depth estimate and ratios of depth (RoDs) estimate, a depth from defocus (DFD) system that generates relative blur estimates (RBE) for each MP associated with each of said predefined pixel patterns found in each of said pairs of images and adjusts the RoDs estimate;
      a first Polynomial Algorithm (PA) Computation Module (PECSM) that uses a projective camera model based PA to generate data that relates RoDs of MPs, 3D positions of MPs and a projective geometry camera model;
      a Depth from Defocus (DFD) Module that includes a Blur Estimation Module to generate relative blur estimates (RBEs) around MPs within each of the pairs of images;
      a second PA Computation Module that relates a relative blur radius associated with different MPs and a depth coordinate of MPs;
      a first Variable Elimination Module (VEM) that receives PAs generated by the first PECSM and the second PA Computation Module to eliminate some variables and generate a multivariate PA data structure that relates a depth of each MP with the RoDs and RBEs;
      a second VEM that receives a multivariate PA from the first VEM to eliminate variables and generates a single variable PA for each MP;
      an Error and Depth Computation Module (EDCM) that receives the single variable PAs from the second VEM and generates error estimates, 2D images, 3D models, and multiple estimated depths for each of said MPs;
   wherein the second category DEM comprises a Depth Estimation Neural Network (NN) Training Module and a Trained Real Time Depth Estimation NN Module;
   wherein the Depth Estimation NN Training Module includes:
      a Sensor Data Simulator Module that receives the pairs of images from the CSICAPM or the ICALM and camera settings and system settings from the CSICAPM to generate estimates of images or calibrated corrected 2D images;
      a Deep Convolutional or Auto-Encoder Feature Extraction Layers with Patterned Input Sampling Training Module that receives 2D images from the Sensor Data Simulator Module or the CSICAPM to generate a NN that extracts image features;
      a Depth Prediction Layers Training Module that receives image features from the Deep Convolutional or Auto-Encoder Feature Extraction Layers with Patterned Input Sampling Training Module to generate a trained depth estimator neural network;
   wherein the Trained Real Time Depth Estimation NN Module includes:
      a Deep Convolutional or Auto-Encoder Feature Extraction Layers Module that receives 2D images from the Sensor Data Simulator Module, the CALM, or the CSICAPM and camera settings and system settings from the CSICAPM and the Deep Convolutional or Auto-Encoder Feature Extraction Layers with Patterned Input Sampling Training Module to generate a data structure of image features;
      a Depth Prediction Layers module that receives image features from the Deep Convolutional or Auto-Encoder Feature Extraction Layers Module and the trained depth estimator neural network from the Depth Prediction Layers Training Module to generate a second category depth estimation and a 3D model of structures;
   a Reinforcement Learning Camera Setting Selection Module comprising:
      a State Extraction Module that receives image and system settings and images from the Sensor Data Simulator Module, the ICALM, or the CSICAPM to generate image features and system states;
      a Cost Measurement Module that receives the image features and system states from the State Extraction Module and depth estimation errors and range/variance of depth estimates from the first category DEM to generate a list or table of cost value for state and action pairs;
      an Action Selection Module that receives the image features and system states and list or table of cost value for each state and action pair from the Cost Measurement Module to generate a data structure that stores camera settings or system adjustments.

2. An autonomous system as in claim 1 further comprising a vehicle comprising an engine, navigation system, said machine vision system, and vehicle maneuver control elements that are controlled based on inputs from the machine vision system and navigation system.

3. An autonomous system including a machine vision system comprising:

at least two cameras with overlapping fields of views (FOV);

a Camera Settings and Image Capture Module (CSICAPM) that operates a first plurality of machine instructions that operate the at least two cameras and a processor to capture pairs of images from the at least two cameras with known camera settings;

an Image Calibration Module (ICALM) that receives the pairs of images and generates calibrated two-dimensional (2D) images using geometric camera calibration processing for correcting for lens distortion and relating camera sensor dimensions within each image into three-dimensional (3D) dimensions of 2D objects within each of the pairs of images;

a Feature Detector and Matching Module that detects predefined pixel patterns associated with same structures in respective said pairs of images then outputs match points (MPs) associated with a detected feature with the predefined pixel patterns;

first and second category depth estimation (DE) modules (DEM) that generate a plurality of first and second depth estimates for each MP;

wherein the first category DEM includes:

a Structure from Motion (SFM) Module to generate an initial first depth estimate and ratios of depth (RoDs) estimate, a depth from defocus (DFD) system that generates relative blur estimates (RBE) for each MP associated with each of said predefined pixel patterns found in each of said pairs of images and adjusts the RoDs estimate;

a first Polynomial Algorithm (PA) Computation Module (PECSM) that uses a projective camera model based PA to generate data that relates RoDs of MPs, 3D positions of MPs and a projective geometry camera model;

a Depth from Defocus (DFD) Module that includes a Blur Estimation Module to generate relative blur estimates (RBEs) around MPs within each of the pairs of images;

a second PA Computation Module that relates a relative blur radius associated with different MPs and a depth coordinate of MPs;

a first Variable Elimination Module (VEM) that receives PAs generated by the first PECSM and the second PA Computation Module to eliminate some variables and generate a multivariate PA data structure that relates a depth of each MP with the RoDs and RBEs;

a second VEM that receives a multivariate PA from the first VEM to eliminate variables and generates a single variable PA for each MP;

an Error and Depth Computation Module (EDCM) that receives the single variable PAs from the second VEM and generates error estimates, 2D images, 3D models, and multiple estimated depths for each of said MPs;

a Reinforcement Learning Camera Setting Selection Module comprising:

a State Extraction Module that receives image and system settings and images from the Sensor Data Simulator Module, the ICALM, or the CSICAPM to generate image features and system states;

a Cost Measurement Module that receives the image features and system states from the State Extraction Module and depth estimation errors and range/variance of depth estimates from the first category DEM to generate a list or table of cost value for state and action pairs; and an Action Selection Module that receives the image features and system states and list or table of cost value for each state and action pair from the Cost Measurement Module to generate a data structure that stores camera settings or system adjustments;

wherein the second category DEM comprises a Depth Estimation Neural Network (NN) Training Module and a Trained Real Time Depth Estimation NN Module;

wherein the Depth Estimation NN Training Module includes:

the Sensor Data Simulator Module that receives the pairs of images from the CSICAPM or the ICALM and camera settings and system settings from the CSICAPM to generate estimates of images or calibrated corrected 2D images;

a Deep Convolutional or Auto-Encoder Feature Extraction Layers with Patterned Input Sampling Training Module that receives 2D images from the Sensor Data Simulator Module or the CSICAPM to generate a NN that extracts image features; and a Depth Prediction Layers Training Module that receives image features from the Deep Convolutional or Auto-Encoder Feature Extraction Layers with Patterned Input Sampling Training Module to generate a trained depth estimator neural network;

wherein the Trained Real Time Depth Estimation NN Module includes:

a Deep Convolutional or Auto-Encoder Feature Extraction Layers Module that receives 2D images from the Sensor Data Simulator Module, the ICALM, or the CSICAPM and camera settings and system settings from the CSICAPM and the Deep Convolutional or Auto-Encoder Feature Extraction Layers with Patterned Input Sampling Training Module to generate a data structure of image features; and a Depth Prediction Layers module that receives image features from the Deep Convolutional or Auto-Encoder Feature Extraction Layers Module and the trained depth estimator neural network from the Depth Prediction Layers Training Module to generate a second category depth estimation and a 3D model of structures.

4. An autonomous system as in claim 3, further comprising a vehicle comprising an engine, navigation system, said machine vision system, and vehicle maneuver control elements that are controlled based on inputs from the machine vision system and navigation system.

5. A method of operating a machine vision system comprising:

providing the machine vision system comprising first and second cameras with overlapping fields of view (FOV), a processor, memory, data storage system, and a plurality of machine readable instructions adapted to operate the machine vision system stored on the data storage system;

executing a first plurality of machine instructions stored on the data storage system that capture a plurality of pairs of images from said first and second cameras;

executing a second plurality of machine instructions stored on the data storage system that performs image feature extraction by searching for predetermined or pre-input image features in the pairs of images and outputs a list of x, y coordinates for point correspondences associated with each predetermined or pre-input image feature;

executing a third plurality of machine instructions stored on the data storage system that computes a first category depth estimate or z coordinate from each x, y coordinate associated with each point correspondence using a plurality of third operations, wherein said third operations comprise: executing a combination of structure from motion (SFM) and depth from defocus (DFD) operations, where the SFM operations are used to respectively determine ratios of depth (RoDs) associated with the first and second cameras, which are associated with a pinhole camera model equation, of a selected set of said predetermined or pre-input image features relative to at least two points of at least one structure within the camera FOVs in a projective geometry model, wherein the DFD operation computes a relative blur estimate (RBE) and ratio of blur to eliminate a calibration step based on a thin lens equation;

executing a fourth plurality of machine instructions stored on the data storage system that executes a first variable elimination (VE) sequence by simplifying a first system of equations (SoE) defined at least in part by the pinhole camera model equation and substituting RoDs to eliminate two depth variables from the first SoE; operating a second VE sequence by simplifying a second SoE defined at least in part by the thin lens equation by substituting RBEs and the RoDs into the second SoE to eliminate another depth variable from the second SoE; and operating a third VE sequence by combining results from the first and second VE sequences and inputting them into a Sylvester Resultant matrix and eliminating another depth variable to produce a fourth power SoE which then is used to compute first category depth estimates or z coordinates for each x, and y coordinate associated with each point correspondence; and executing a fifth plurality of machine instructions stored on the data storage system that computes a second category depth estimate or z coordinate from each x, y coordinate associated with each point correspondence using a depth estimation neural network training system, a depth estimation neural network system operable to produce the second category depth estimate for each x, y coordinate associated with each point correspondence, and a comparator operable to compare said first and second category depth estimates to determine if the two estimates are within a predetermined range from each other, wherein if said first and second category depth estimates are outside of said predetermined range, then said depth estimation neural network training system is operated to produce a revised neural network depth estimator training dataset.

6. A method as in claim 5, wherein said predetermined or pre-input image features comprise corners of a structure or pixels collectively showing an angled structure image element.

7. A method as in claim 5, wherein the pinhole camera model equation is defined by $D_{Camera\ o\ Point\ k-m}^2 - D_{Camera\ p\ Point\ k-m}^2 = 0$, wherein D is a function of a distance between two points recorded by a respective camera, and the thin lens equation is defined by $(\sigma_{Point\ K\ Camera\ o}^2 - \sigma_{Point\ k\ Camera\ p}^2) - (R_{o_{Camera\ o}}^2 - o_{Camera\ p}^2\ Points\ k-m) \times (\sigma_{Point\ m\ Camera\ o}^2 - \sigma_{Point\ m\ Camera\ p}^2) = 0$, wherein σ is a relative blur radius for a respective point and camera, and R is a ratio of relative blur between two points for the first and second cameras.

8. A method for producing a three dimensional model data from multi-perspective two dimensional images comprising:

capturing a first and second plurality of images from a first and second camera that are oriented with a first and second overlapping fields of view (FOV) with a first controller section;

determining or setting camera settings comprising focus, exposure, and zoom with a second controller section;

identifying a plurality of features within two or more sets of the first and second plurality of images using a third control section comprising a feature detection system to identify point correspondences (PCs) in the two or more sets of the first and second plurality of images and store a first and second list of x, y coordinates of PCs associated with each feature found in at least one corresponding pair of said first and second plurality of images;

performing a first and second depth estimation processing using a fourth controller section respectively comprising performing structure from motion (SFM) processing and depth from defocus (DFD) processing to respectively produce a plurality of depth estimates for each PC and a relative blur estimate around each PC, wherein said DFD processing comprises determining relative blur estimates around said PCs for pairs of points within each of said sets of the first and second plurality of images;

defining or using a provided first polynomial algorithm (PA) defining or describing a projective camera model using a fifth controller section including respective relationships between x, y coordinates within sets of PCs and said first and second cameras and outputting first and second ratios of depth (RoDs), a list of coefficients for variables in the projective camera model that describe relationships between three dimensional coordinates of arbitrary sets or pairs of combinations of PCs and the first PA;

defining or using a provided second PA using a sixth controller section describing relationships between PCs and said first and second cameras based on a thin lens equation and computing relative blur ratios using sets of RBEs divided by each other that is used to cancel an element of the second PA;

executing a simplification processing machine instruction sequence using a seventh controller section to perform variable elimination or reduction of a system of equations (SoE) comprising said first and second PAs comprising a data entry operation comprising substitution of said first and second RoDs into said first PA and second PA to eliminate a first and second variable and output a first simplified SoE (FSSoE) multivariate polynomial;

solving said FSSoE using an eighth controller section by finding roots of the FSSoE using a system of Sylvester Resultant univariate polynomials to eliminate another variable and generating a second simplified SOE (SSSoE) and multiple possible solutions to the SSSoE;

determining a best solution for each of said PCs using a ninth controller section by back-substituting each of said possible solutions into each Sylvester Resultant univariate polynomial or the SSSoE and calculating a mean result of the back substitution while excluding outliers of the back substitution to obtain an algebraic or geometric (A/G) error estimate of each depth estimate to produce a first category depth estimate;

computing and outputting a three-dimensional (3D) model of image structures within said first and second camera overlapping FOVs, wherein said 3D model comprises a second category depth estimate for selected x,y pixels in input two-dimensional (2D) images; and operating a reinforcement learning camera settings selection module comprising a state extraction module, a cost measurement module, and an action selection module for selecting or determining said camera settings; and operating a second category depth computation module comprising a monocular depth estimation system comprising a depth estimation neural network (NN) training module and a trained real time depth estimation module which uses a trained NN depth estimation module output from said depth estimation NN training module, wherein said depth estimation NN training module comprises a first deep convolutional or auto-encoder feature extraction layers with patterned input sampling training module and a first depth prediction layer training module configured to compute and output said trained NN depth estimation module, wherein said trained real time depth estimation module comprises a deep convolutional or auto-encoder feature extraction layer with patterned input sampling and a second depth prediction layer module configured to use said trained NN depth estimation module to compute a second category depth estimate or z coordinate for selected x, y coordinates in said first and second plurality of images, wherein said second category depth computation module outputs a 3D model of structures from within said first and second plurality of images.

9. An autonomous mobile system comprising:

a vehicle comprising an engine, navigation system, a machine vision system, and vehicle maneuver control elements that are controlled based on inputs from the machine vision system and navigation system, wherein the machine vision system comprises a system for executing a plurality of machine instructions that execute a method for producing a three dimensional model data from multi-perspective two dimensional images, the method comprising:

capturing a first and second plurality of images from a first and second camera that are oriented with a first and second overlapping fields of view (FOV) with a first controller section;

determining or setting camera settings comprising focus, exposure, and zoom with a second controller section;

identifying a plurality of features within two or more sets of the first and second plurality of images using a third control section comprising a feature detection system to identify point correspondences (PCs) in the two or more sets of the first and second plurality of images and store a first and second list of x, y coordinates of PCs associated with each feature found in at least one corresponding pair of said first and second plurality of images;

performing a first and second depth estimation processing using a fourth controller section respectively comprising performing structure from motion (SFM) processing and depth from defocus (DFD) processing to respectively produce a plurality of depth estimates for each PC and a relative blur estimate around each PC, wherein said DFD processing comprises determining relative blur estimates around said PCs for pairs of points within each of said sets of the first and second plurality of images;

defining or using a provided first polynomial algorithm (PA) defining or describing a projective camera model using a fifth controller section including respective relationships between x, y coordinates within sets of PCs and said first and second cameras and outputting first and second ratios of depth (RoDs), a list of coefficients for variables in the projective camera model that describe relationships between three dimensional coordinates of arbitrary sets or pairs of combinations of PCs and the first PA;

defining or using a provided second PA using a sixth controller section describing relationships between PCs and said first and second cameras based on a thin lens equation and computing relative blur ratios using sets of RBEs divided by each other that is used to cancel an element of the second PA;

executing a simplification processing machine instruction sequence using a seventh controller section to perform variable elimination or reduction of a system of equations (SoE) comprising said first and second PAs comprising a data entry operation comprising substitution of said first and second RoDs into said first PA and second PA to eliminate a first and second variable and output a first simplified SoE (FSSoE) multivariate polynomial;

solving said FSSoE using an eighth controller section by finding roots of the FSSoE using a system of Sylvester Resultant univariate polynomials to eliminate another variable and generating a second simplified SOE (SSSoE) and multiple possible solutions to the SSSoE;

determining a best solution for each of said PCs using a ninth controller section by back-substituting each of said possible solutions into each Sylvester Resultant univariate polynomial or the SSSoE and calculating a mean result of the back substitution while excluding outliers of the back substitution to obtain an algebraic or geometric (A/G) error estimate of each depth estimate to produce a first category depth estimate;

computing and outputting a three-dimensional (3D) model of image structures within said first and second camera overlapping FOVs, wherein said 3D model comprises a second category depth estimate for selected x,y pixels in input two-dimensional (2D) images; and operating a reinforcement learning camera settings selection module comprising a state extraction module, a cost measurement module, and an action selection module for selecting or determining said camera settings; and operating a second category depth computation module comprising a monocular depth estimation system comprising a depth estimation neural network (NN) training module and a trained real time depth estimation module which uses a trained NN depth estimation module output from said depth estimation NN training module, wherein said depth estimation NN training module comprises a first deep convolutional or auto-encoder feature extraction layers with patterned input sampling training module and a first depth prediction layer training module configured to compute and output said trained NN depth estimation module, wherein said trained real time depth estimation module comprises a deep convolutional or auto-encoder feature extraction layer with patterned input sampling and a second depth prediction layer module configured to use said trained NN depth estimation module to compute a second category depth estimate or z coordinate for selected x, y coordinates in said first and second plurality of images, wherein said second category depth computation module outputs a 3D model of structures from within said first and second plurality of images.

10. A machine vision system comprising:
a first and second camera system respectively configured to have a first and second overlapping field of view (FOV);
a first control module comprising a camera settings and image capture module that outputs a plurality of first and second image sets and a camera settings data structure;
a second control module comprising an image feature detector and matching module configured to identify image features and associated x, y coordinates from said first and second image sets based on a predetermined one or more image features;
a third control module comprising a first category depth estimator module selector or bypass system;
a fourth control module comprising an image calibration module configured to optionally perform image calibration operations on said plurality of first and second image sets;
a fifth control module comprising a first category depth computation module configured to compute and output a neural network (NN) training input dataset comprising said first and second image sets and associated three-dimensional (3D) x, y, and first category z coordinates associated with said identified image features;
a sixth control module comprising a second category depth computation module configured to compute and output a 3D model of image structures within said first and second camera overlapping FOVs including a second category depth estimate for selected x,y pixels in input two-dimensional (2D) images; and
a seventh control module comprising a reinforcement learning camera settings selection module;
wherein said first category depth computation module comprises a structure from motion (SFM) computation module, a first polynomial algorithm (PA) computation module comprising a projective camera model based PA, a depth from defocus (DFD) module comprising a blur estimation module and a second PA computation module, a first variable elimination module (VEM) configured to eliminate a first and second depth variable from first and second PAs, a second VEM including a Sylvester Resultant Module for eliminating a third depth variable from the first and second PAs, and an error and depth computation module for determining algebraic or geometric error (A/G);
wherein said second category depth computation module comprises a monocular depth estimation system comprising a depth estimation NN training module and a trained real time depth estimation module which uses a trained NN depth estimation module output from said depth estimation NN training module;
wherein said depth estimation NN training module comprises a first deep convolutional or auto-encoder feature extraction layers with patterned input sampling training module and a first depth prediction layer training module configured to compute and output said trained NN depth estimation module;
wherein said trained real time depth estimation module comprises a deep convolutional or auto-encoder feature extraction layer with patterned input sampling and a second depth prediction layer module configured to use said trained NN depth estimation module to compute a second category depth estimate or z coordinate for selected x, y coordinates in said first and second image sets;
wherein said reinforcement learning camera settings selection module comprises a state extraction module, a cost measurement module, and an action selection module for selecting or determining said camera settings.

11. An autonomous mobile system comprising:
a vehicle comprising an engine, navigation system, a machine vision system, and vehicle maneuver control elements that are controlled based on inputs from the machine vision system and navigation system, wherein the machine vision system comprises:
a first and second camera system respectively configured to have a first and second overlapping field of view (FOV);
a first control module comprising a camera settings and image capture module that outputs a plurality of first and second image sets and a camera settings data structure;
a second control module comprising an image feature detector and matching module configured to identify image features and associated x, y coordinates from said first and second image sets based on a predetermined one or more image features;
a third control module comprising a first category depth estimator module selector or bypass system;
a fourth control module comprising an image calibration module configured to optionally perform image calibration operations on said plurality of first and second image sets;
a fifth control module comprising a first category depth computation module configured to compute and output a neural network (NN) training input dataset comprising said first and seconds image sets and associated three-dimensional (3D) x, y, and first category z coordinates associated with said identified image features;
a sixth control module comprising a second category depth computation module configured to compute and output a 3D model of image structures within said first and second camera overlapping FOVs including a second category depth estimate for selected x,y pixels in input two-dimensional (2D) images; and
a seventh control module comprising a reinforcement learning camera settings selection module;
wherein said first category depth computation module comprises a structure from motion (SFM) computation module, a first polynomial algorithm (PA) computation module comprising a projective camera model based PA, a depth from defocus (DFD) module comprising a blur estimation module and a second PA computation module, a first variable elimination module (VEM) configured to eliminate a first and second depth variable from first and second PAs, a second VEM including a Sylvester Resultant Module for eliminating a third depth variable from the first and second PAs, and an error and depth computation module for determining algebraic or geometric error (A/G);

wherein said second category depth computation module comprises a monocular depth estimation system comprising a depth estimation NN training module and a trained real time depth estimation module which uses a trained NN depth estimation module output from said depth estimation NN training module;

wherein said depth estimation NN training module comprises a first deep convolutional or auto-encoder feature extraction layers with patterned input sampling training module and a first depth prediction layer training module configured to compute and output said trained NN depth estimation module;

wherein said trained real time depth estimation module comprises a deep convolutional or auto-encoder feature extraction layer with patterned input sampling and a second depth prediction layer module configured to use said trained NN depth estimation module to compute a second category depth estimate or z coordinate for selected x, y coordinates in said first and second image sets;

wherein said reinforcement learning camera settings selection module comprises a state extraction module, a cost measurement module, and an action selection module for selecting or determining said camera settings.

* * * * *